(12) United States Patent
Drew et al.

(10) Patent No.: US 8,339,254 B2
(45) Date of Patent: *Dec. 25, 2012

(54) USER CONFIGURED DISPLAY SYSTEM FOR MOTOR VEHICLE

(75) Inventors: Michael Drew, Dexter, MI (US); Brian Herron, Dexter, MI (US)

(73) Assignee: Drew Technologies, Ann Arbor, MI (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/341,850

(22) Filed: Dec. 22, 2008

(65) Prior Publication Data

US 2009/0184812 A1 Jul. 23, 2009

Related U.S. Application Data

(63) Continuation-in-part of application No. 11/836,672, filed on Aug. 9, 2007, now Pat. No. 7,786,851.

(51) Int. Cl.
*B60Q 1/00* (2006.01)
*G01M 17/00* (2006.01)
*G09G 5/00* (2006.01)

(52) U.S. Cl. ........ 340/438; 340/439; 340/440; 340/441; 340/449; 340/450; 340/451; 340/453; 340/459; 340/462; 701/29; 701/30; 701/31; 701/32; 701/33

(58) Field of Classification Search .......... 340/438–456; 701/29–36
See application file for complete search history.

(56) References Cited

U.S. PATENT DOCUMENTS

| | | | |
|---|---|---|---|
| 5,365,436 A * | 11/1994 | Schaller et al. ................. | 701/33 |
| 5,819,201 A | 10/1998 | DeGraaf | |
| 6,633,482 B2 | 10/2003 | Rode | |
| 6,690,268 B2 * | 2/2004 | Schofield et al. ............. | 340/438 |
| 6,816,760 B1 | 11/2004 | Namaky | |
| 7,116,216 B2 * | 10/2006 | Andreasen et al. ........... | 340/438 |
| 7,184,887 B2 | 2/2007 | Wood et al. | |
| 7,444,216 B2 | 10/2008 | Rogers et al. | |
| 7,571,034 B2 | 8/2009 | Raichle et al. | |
| 7,573,706 B2 | 8/2009 | Carnevali | |
| 7,809,482 B2 | 10/2010 | Bertosa et al. | |
| 2002/0049538 A1 | 4/2002 | Knapton et al. | |
| 2004/0095255 A1 * | 5/2004 | Namaky et al. .......... | 340/815.78 |
| 2006/0271246 A1 | 11/2006 | Bell et al. | |

(Continued)

OTHER PUBLICATIONS

PCMSCAN—Palmer Performance Engineering, LLC, pp. 1-6 from http://replay.web.archive.org/20051031142938/http:/Iwww.palmerperformance.com/pcms.

(Continued)

*Primary Examiner* — Brent Swarthout
(74) *Attorney, Agent, or Firm* — McHale & Slavin, P.A.

(57) ABSTRACT

The present invention is directed toward a data acquisition and display system for vehicles that connects to the vehicle's on-board computer(s) via a data link connector (DLC). The system includes a display module suitable for permanent or temporary attachment within the interior of a vehicle. The display module preferably includes a full color monitor that also functions as a touch screen for inputting commands to the computer within the display module. The computer includes a suitable processor, operating system, software and tangible data storage media to allow multiple user configurable graphics. The display module collects information from the vehicle via multiple busses and senders through the data link connector and displays the information on the screen of the display module in a user configured graphics format. The software is constructed and arranged to allow user configuration of the displayed graphics by clicking or touching the graphics image.

19 Claims, 24 Drawing Sheets

U.S. PATENT DOCUMENTS

| | | |
|---|---|---|
| 2007/0032950 A1 | 2/2007 | O'Flanagan et al. |
| 2007/0124043 A1 | 5/2007 | Ayoub et al. |
| 2007/0185627 A1 | 8/2007 | Mavreas |

OTHER PUBLICATIONS

Edge Products—"A2 A Whole New Attitude"—from http://www.edgeproducts.com.

"Diesel Power" magazine pp. 186-188, 190 showing Bully Dog's product "electronic gadget" taken from www.dieselpowermag.com Aug. 2007 issue.

USPTO Office Action for U.S. Appl. No. 11/836,672 dated Aug. 25, 2009.

Response to Office Action of Aug. 25, 2009 for U.S. Appl. No. 11/836,672.

Drew Technologies 2005 Testing Expo flier.

Drew Technologies SEMA flier entitled "CarDaq-Plus".

Drew Technologies SEMA flier entitled "Mongoose Family".

Internet archive WaybackMachine capture of http://www.edgeproducts.com taken Jul. 12, 2006 showing "A2 A Whole New Attitude".

Drew Technologies Webpage entitled "Vehicle Interfaces" from http://replay.web.archive.org/20060616044609/http://drewtech.com/products/mongoose.html.

MP3 CAR Website forum from http://www.mp3car.com/engine-management-obd-ii-engine-diagnostics-etc/75148-software. . .

MP3 CAR Website forum from http://www.mp3car.com/engine-management-obd-ii-engine-diagnostics-etc/71858-pcmscan-integ. . .

MP3 CAR Website forum from http://classic-web.archive.org/web/20041211005835/www.mp3car.com/store/.

RAM Mount Catalog from 2006.

\* cited by examiner

USER CONFIGURED DISPLAY SYSTEM FOR MOTOR VEHICLE

RELATED APPLICATIONS

This application is a continuation in part of U.S. application Ser. No. 11/836,672 filed Aug. 9, 2007 now U.S. Pat. No. 7,786,851 and entitled Data Acquisition and Display System for Motor Vehicle, the contents of which are incorporated herein in their entirety.

FIELD OF INVENTION

The present invention generally relates to a display device for use in a motor vehicle, and more particularly to a digital display system that integrates with the vehicle's on-board computer as well as peripheral devices for acquisition and display of information in a user configurable format.

BACKGROUND INFORMATION

An instrument panel provides a variety of functions within a vehicle. Gauges mounted within the panel are the primary interface between the driver and the vehicle. For example, a speedometer indicates the speed of the vehicle; a tachometer shows the rotational speed of the engine; while other gauges monitor and show engine temperature, fluid levels and various other parameters.

Typically in a vehicle, a factory installed instrument panel is designed to present a particular arrangement, e.g. a cluster of gauge-type instruments in a pre-set design. These instruments generally include sensors or senders positioned at appropriate points within the vehicle. Each sensor monitors one of numerous parameters and electrically or mechanically transmits a proportional output to an associated instrument. A needle or pointer is mounted on the rotary output shaft of a gauge motor and assumes different positions based on the control signal received by the instrument. The needle is positioned near a display that bears markings relevant to the condition being measured, and the needle points to various indicia as it turns. For example, if the gauge is part of a speedometer, the indicia on the gauge display will indicate various rates of speed in miles or kilometers per hour.

Accurate readings of the factory installed instruments often require the driver to divert attention from the road for extended time periods. Steering wheel or seat positioning may cause a portion of the gauges to become obstructed from clear view, extending the time it takes a driver to accurately read a cluster of instruments. Because many of the instruments must be read while the vehicle is in motion, the time required to complete a reading of the instruments may create a dangerous situation. A vehicle traveling at 60 miles per hour moves 88 feet per second, thus a driver takes his eyes off the road for 88 feet every second he/she diverts their attention to the instrument panel.

An instrument panel also functions as a key component to the interior design of a vehicle. Through the selection of surface material and contour as well as types of displays, backlighting and switches, the instrument panel can change the personality of a vehicle. Vehicle owners often install aftermarket gauges to enhance the attributes of the vehicle, either for actual performance measurement or to dress-up the vehicle for competition. Competition has always been popular among car enthusiasts and has included contests of speed, endurance, detailing, etc., each of which require the vehicle to assume a different personality.

Aftermarket gauges are mounted in various positions within the passenger compartment of the vehicle, generally within peripheral view of the driver. Often the aftermarket gauges are mounted in groups or clusters within gauge pods on the A-pillar of the vehicle or within gauge cups or panels mounted on top or under the dash of the vehicle. The cluster mounts allow the driver to view multiple gauges in a single glance. One common type of gauge, often called a panel meter gauge, is housed in a small cylindrically shaped housing having a lens at one end and lead-in terminals at the other end. The housings are generally available in various standard diameters, with 2¹⁄₁₆" and 2⅝" being the most popular. The standard diameters of the gauge housings correspond to apertures provided in the gauge pods, cups and panels to allow the instrument panels to be customized according to the vehicle owner's preference. However, once the gauge layout and theme are chosen and installed, a change requires replacement and/or reconnection of the gauges.

Generally, the aftermarket gauges are connected in one of two ways. In the first, the car enthusiast locates the correct wiring and splices the new gauge wiring into the existing sensor wiring. Locating the correct wires and following them to a convenient splice point is a difficult task and requires knowledge, time, patience, and skill that some individuals simply do not have. Moreover, this greatly complicates the task of writing comprehensive instructions because many models and makes of automobiles require individually tailored instructions to account for differences in vehicle configurations. In addition, if the splice is not correctly performed and properly sealed, the gauge will fail to work, and the connection between the sensor and the gauge may be degraded, resulting in the possible malfunction of that sensor, and possibly affecting operation of the internal combustion system. In addition, over time the splice connection might fail due to the constant vibrations within the automotive environment. The second common way to connect additional gauges is to add additional sensors to the automobile. Adding additional sensors is a complicated process, which involves mounting the sensor, connecting power to the sensor, and routing the wire to the new gauge. The skill that is required to perform this task is beyond that of many individuals.

Modern vehicles are generally equipped with numerous sensors, such as, for example, oil pressure, coolant temperature, transmission temperature, engine temperature, steering position, air/fuel ratio, etc. Typically, the sensors are connected to an on-board computer control module that continually monitors the sensors and regulates the vehicles functions accordingly. Generally the information generated by the sensor is continually passed along the vehicle data link as part of the vehicle diagnostic system. The vehicle diagnostic system cooperates with the factory installed gauge cluster to provide failure fault indications to the driver in the form of a "service engine" light. The vehicle diagnostic system typically includes one or more separate computer control modules. Examples of such computer control modules (also known as just "modules") are: a powertrain control module (PCM), an engine control module (ECM), a transmission control module (TCM), an anti-lock brake system (ABS) control module, and an air bag control module. Typically the computer control modules are connected together by a data link, forming the vehicle diagnostic system. The data link typically has a connection point, or data link connector (DLC) that is normally located under the dash of the vehicle. The vehicle diagnostic system is generally used to provide relevant information to repair technicians. The DLC provides repair technicians with a place to connect off-board vehicle diagnostic devices, such as scan tools and code readers for communication with the vehicle diagnostic system.

"Off-board devices," such as scan tools and code readers are known in the art. Scan tool and code reader testing devices interface with vehicle diagnostic systems to access, display, and/or print vehicle diagnostic information. On-Board Diagnostics Version II (OBD II) Scan Tools are one commonly known type of scan tool and are governed by a number of standards, e.g., SAE J1978 Rev. 1998-02, SAE J1979 Rev. 1997-09, ISO9141/KWP2000, CAN/IS015765, SAE J1850 PWM, SAE J1850 VPW or the like.

A "Manufacturer-Specific Scan Tool" is a scan tool that accesses and displays proprietary manufacturer-specific data (and possibly also additionally accesses and displays OBD II data). Examples of proprietary manufacturer-specific data include Device Controls on General Motors, On-Demand Tests in Ford, Actuator Tests, Sensor Tests, Interrogator, and Read Temporary Codes in Chrysler. In general, air bag data, ABS data, cruise control data, and climate control data are also considered to be proprietary manufacturer-specific data and are typically included only in Manufacturer-Specific Scan Tools.

Typically, scan tools are capable of performing at least some of the following major functions: "View Data," also known as "Live Data," "Data," and "Data Test, DTC" (viewing and displaying in real-time live changing data from a plurality of module sensors), display of textual diagnosis descriptions corresponding to the various diagnostic codes, recording and playback of data, device control (manually controlling modules for diagnostic purposes), and reading and displaying vehicle information from the vehicle's computer (e.g., VIN information, controller calibration identification number, etc.).

However, the scan tools are often large, cumbersome wheeled devices that set outside of the vehicle with cables extending into the vehicle. Portable scan tool devices are also known; these devices are generally not constructed for permanent installation within a vehicle, nor are they generally equipped for connection to, and collection of data from, peripheral devices. Still yet, scan tools do not include software that allows a user to customize gauges for display on the monitor of the scan tool.

Therefore, there exists a need for a display device that collects information from multiple busses and senders, and can display the information on the screen of the display in a user configured format. The device should also be capable of recording the signals received from the busses and senders as well as signals from peripheral devices simultaneously to single or multiple file(s) with matching timestamps. The system should be configured so that the user can design his/her own gauge displays "skins" in the form of graphics, graphs, fonts, needles, buttons, program generated objects, and backgrounds. The system should store multiple user created skins which can be recalled for use by the user. The system should also allow the user to reassign a gauge skin to a different signal received from one of the busses or peripheral devices. The system should also be configured for automatic skin changes in response to ambient light conditions. The system should also be configured to change background color, font size and shape, and sound alarms or signals based on the signal values being received from the busses. The system should also capable of displaying data from multiple busses and peripheral devices simultaneously on the same display. The system should also configured for bi-directional communication with the vehicle's on-board computer(s) for diagnostics as well as reprogramming of the on-board computer(s).

The system should also be configured to integrate with or function as a GPS. The system should also be configured to store and display a commercial that illustrates the functions and capabilities of the device. The software utilized in the system should also be adapted for use in aviation, marine, and industrial devices.

Thus, the present invention provides a gauge display system which overcomes the disadvantages of prior art scanners and gauges. The gauge display system of the present invention not only provides for relative ease in installation of the system, it also permits customization of the display/interface as well as connectivity to peripheral devices.

SUMMARY OF THE INVENTION

Briefly, the present invention is directed toward a data acquisition and display system for vehicles that connects to the vehicle's on-board computer(s) via a data link connector (DLC). The system includes a display module suitable for permanent or temporary attachment within the interior of a vehicle. The display module preferably includes a full color monitor that also functions as a touch screen for inputting commands to the computer within the display module. The computer includes a suitable processor, operating system, software and tangible data storage media to allow multiple user configurable functions. The display module collects information from the vehicle via multiple busses and senders through the data link connector and displays the information on the screen of the display module in a user configured format. The direct connection between the display module and the data link facilitates bi-directional communication with the vehicle's on-board computer(s) for diagnostics as well as reprogramming of the on-board computer(s) which may be accomplished in real-time.

The system is configured so that the user can design and store his/her own gauge displays "skins" in the form of graphics, graphs, fonts, needles, buttons, program generated objects, and backgrounds that can be stored and recalled for display on the display module monitor. Input signals from the various sensors within the vehicle can be assigned and reassigned to a specific gauge skin or to a specific display contained within a gauge skin.

The software gives the user the ability to click on a gauge skin to configure its appearance as well as its function within the vehicle. By clicking on a gauge skin the user can change the type of gauge or combination of gauges that will be displayed, (e.g. analog gauge, digital gauge, slider bar, graph, dashboard etc.), the source of the signal displayed on the gauge, (e.g. analog, OBD2, USB, Bluetooth etc.), the signal that will be displayed, (e.g. water temp, turbo boost, acceleration etc.), the scale of the divisions on the gauge, fonts, the high and/or low limits of the gauge, units of measure, colors, positioning of indicator needles, gauge overlap, warnings, buttons etc.

As a safety feature, the system can be configured for automatic skin changes in response to ambient light conditions and may additionally change background color, font size and shape, and/or sound alarms based on the signal values being received from the busses. The system is also capable of displaying data from multiple busses and peripheral devices simultaneously on the same display. Alternatively, the data can be stored on the permanent or removable memory of the device with timestamps so that the data can be recalled and viewed simultaneously on the display module monitor.

In addition, the system includes multiple communication ports configured for attachment to peripheral devices such as cameras, GPS, accelerometers, sensors and the like. The system may also include a wireless connection, such as Bluetooth or the like, that may be utilized for connection to peripheral devices or sensors positioned within the vehicle.

The device also includes a computer readable medium (permanent or removable memory) suitable for recording the signals received from the busses and senders, as well as signals from peripheral devices, simultaneously to single or multiple file(s) with matching timestamps. This construction allows data from sensors in the vehicle to be recalled and viewed in combination with data from a peripheral device such as a video camera on the monitor. This arrangement can be extremely helpful to car enthusiasts that wish to improve performance in competition settings. Moreover, the system is configured to integrate with a GPS. The GPS information can be evaluated in conjunction with the sensor data and/or other peripheral device data for performance enhancement or positional awareness and may be used in a manner similar to that of a flight recorder, whereby data relating to throttle position, steering angle, braking and the like may be utilized for accident reconstruction.

Still yet, the combination of the processor and storage media in the display module permits promotional information to be stored, recalled and displayed on the monitor within a retail store for promotion of the display system.

Accordingly, it is an objective of the present invention to provide a data acquisition and display system for communicating with the on-board computer(s) of a vehicle that includes a computer processor, software and computer readable storage for operator configured display of the data received from the vehicle.

It is a further objective of the present invention to provide a data acquisition and display system that provides bi-directional communication between the gauge display system and the on-board computer(s) of the vehicle.

It is yet a further objective of the present invention to provide a data acquisition and display system that, in addition to cooperating with the on-board computer(s), cooperates with peripheral devices for acquisition of data which can be combined.

It is another objective of the instant invention to provide a data acquisition and display system that includes a touch screen for control of gauge face graphic designs, communication with the on-board computer(s), and control of peripheral devices.

It is yet another objective of the instant invention to provide a data acquisition and display system that includes automatic power-up and power-down modes to conserve vehicle power.

It is still another objective of the instant invention to provide a data acquisition and display system that integrates with at least one on-board computer and/or functions as a GPS.

It is still yet another objective of the instant invention to provide a data acquisition and display system that displays sensor outputs received from an on-board computer in a user configured graphics display.

It is still yet another objective of the instant invention to provide software for data acquisition and display systems that allows a user to configure the appearance of a gauge display.

It is still yet another objective of the instant invention to provide software constructed and arranged to allow a user to choose a source of signal for display on a data acquisition and display system.

It is still yet another objective of the instant invention to provide software constructed and arranged to allow a user to choose the signals that are displayed on a data acquisition and display system.

It is still yet another objective of the instant invention to provide software constructed and arranged to allow a user to change the scale of division marks, set high/low limits, configure warnings, scale signal information, change units of measure, change colors, change font types, positioning of indicator needles, graphics used in each gauge, gauge order and overlay of the signals that are displayed on a data acquisition and display system.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 21 is a front view illustrating configuration of a graph type gauge skin;

DETAILED DESCRIPTION OF THE PREFERRED EMBODIMENTS

Figure 1:
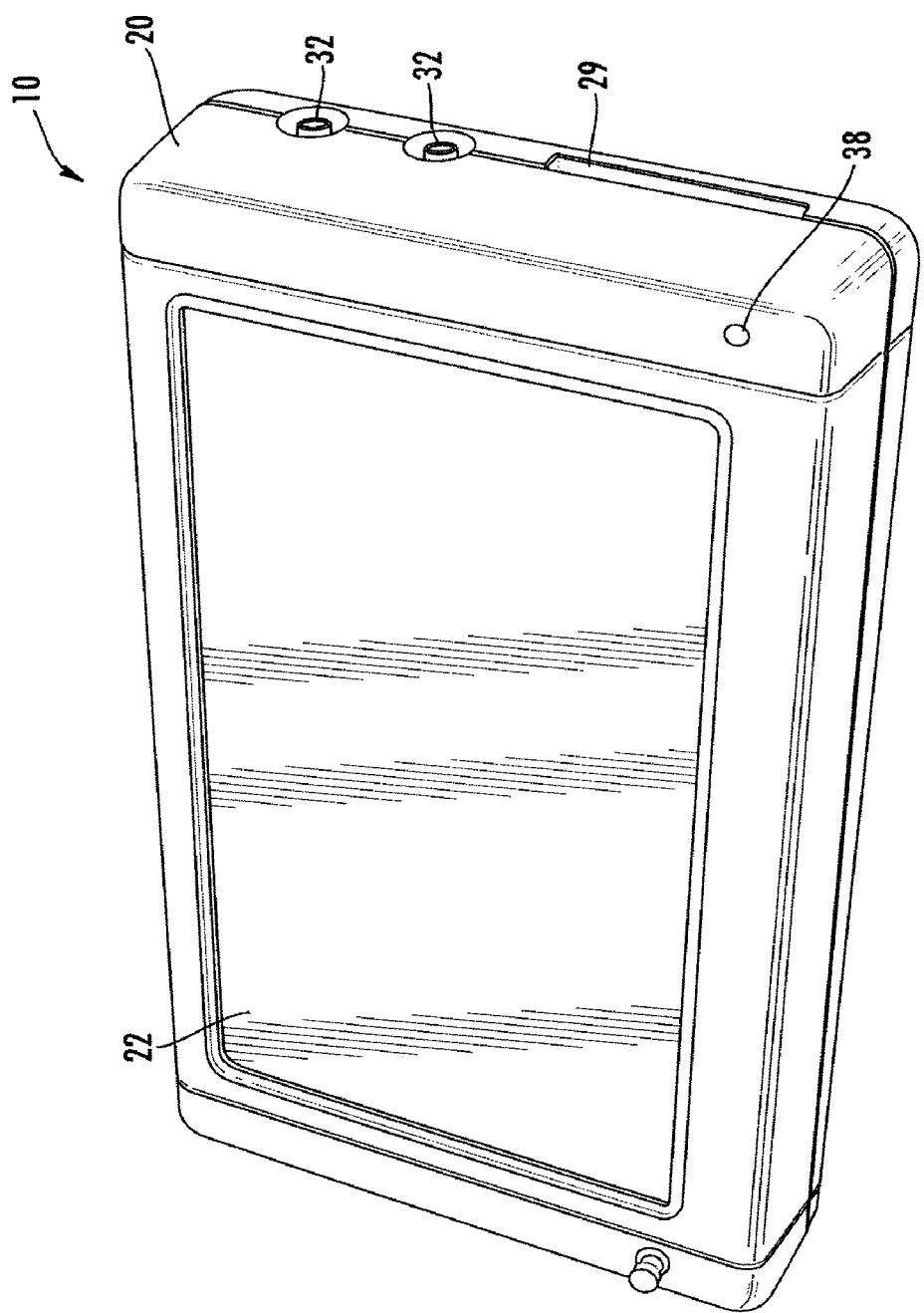
FIG. 1 is a top perspective view of one embodiment of the instant invention.
Figure 2:
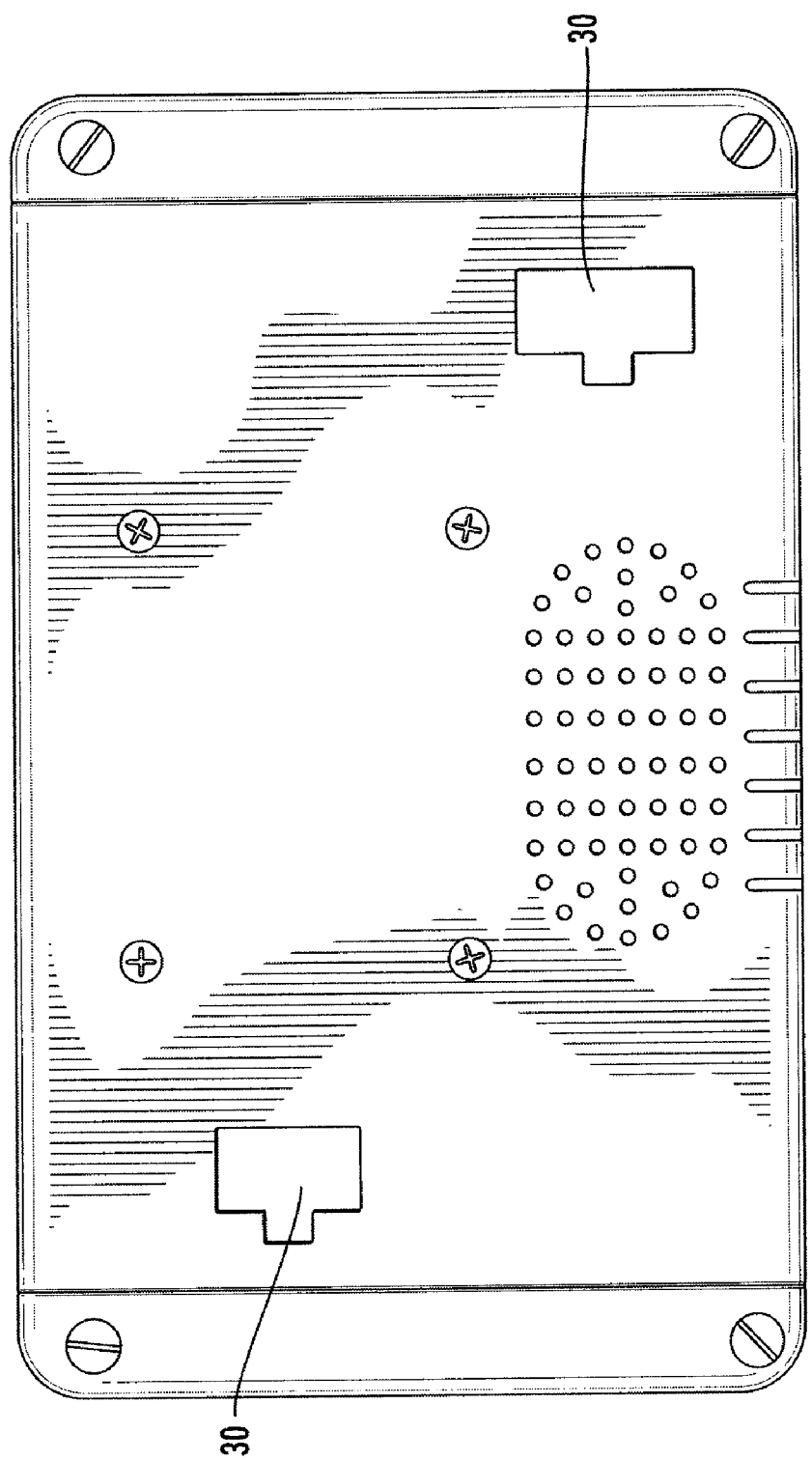
FIG. 2 is a rear view of the embodiment shown in FIG. 1.
Figure 3:
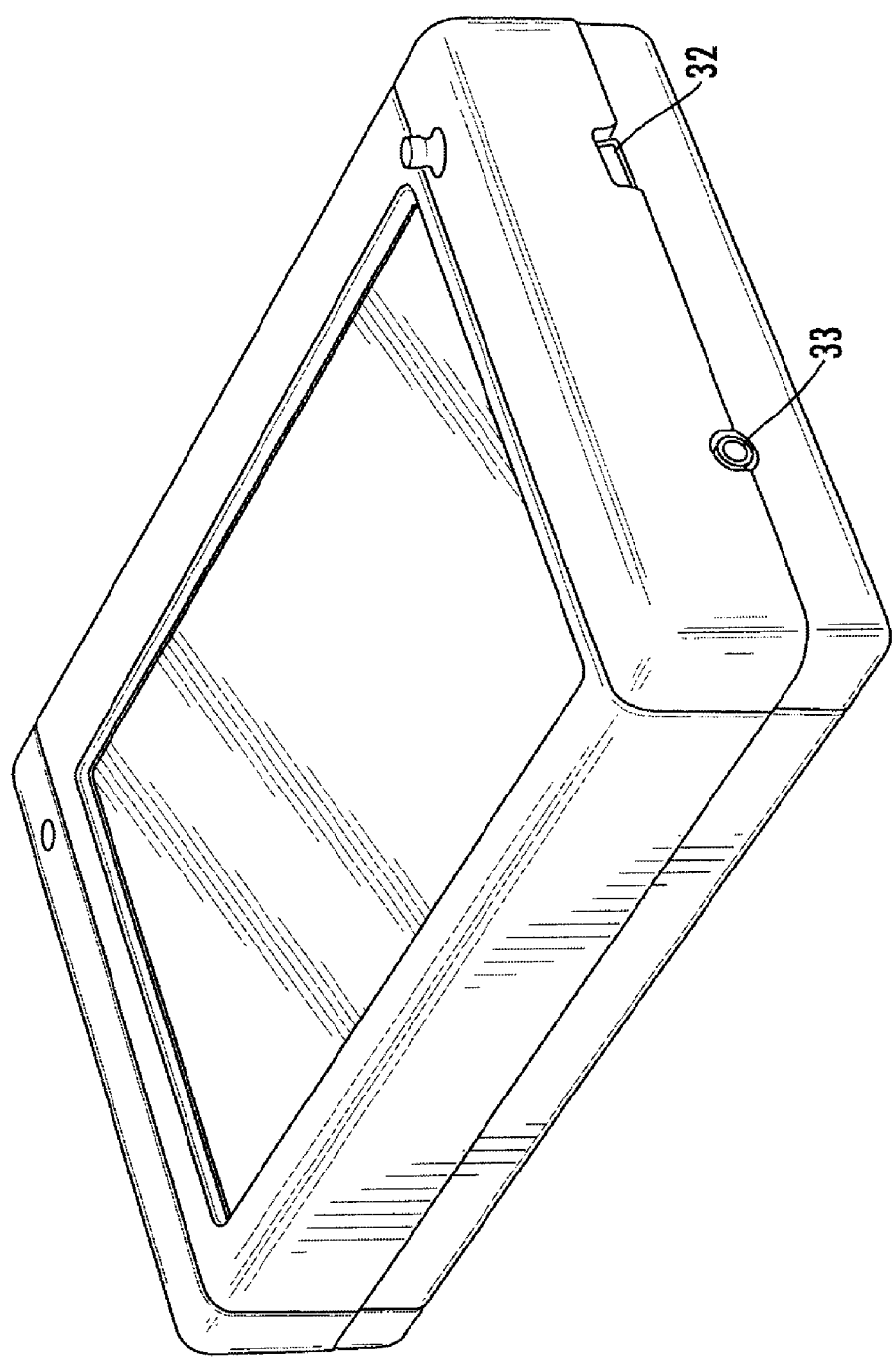
FIG. 3 is a top perspective view of the embodiment shown in FIG. 1 illustrating connection ports.
Figure 4:
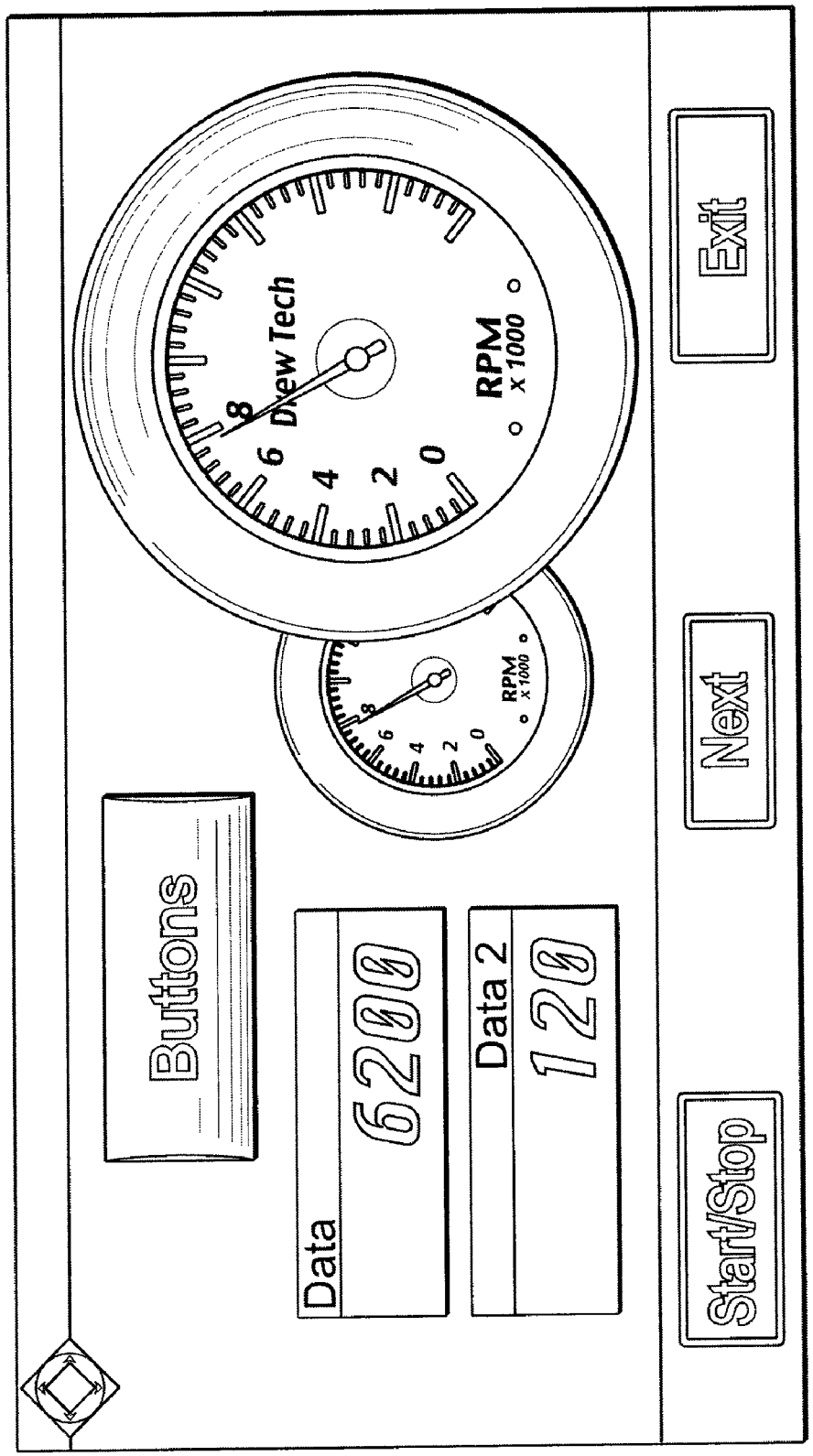
FIG. 4 is a front view illustrating a gauge skin representative of data received from the on-board computer(s) as well as data received from a peripheral device.
Figure 5:
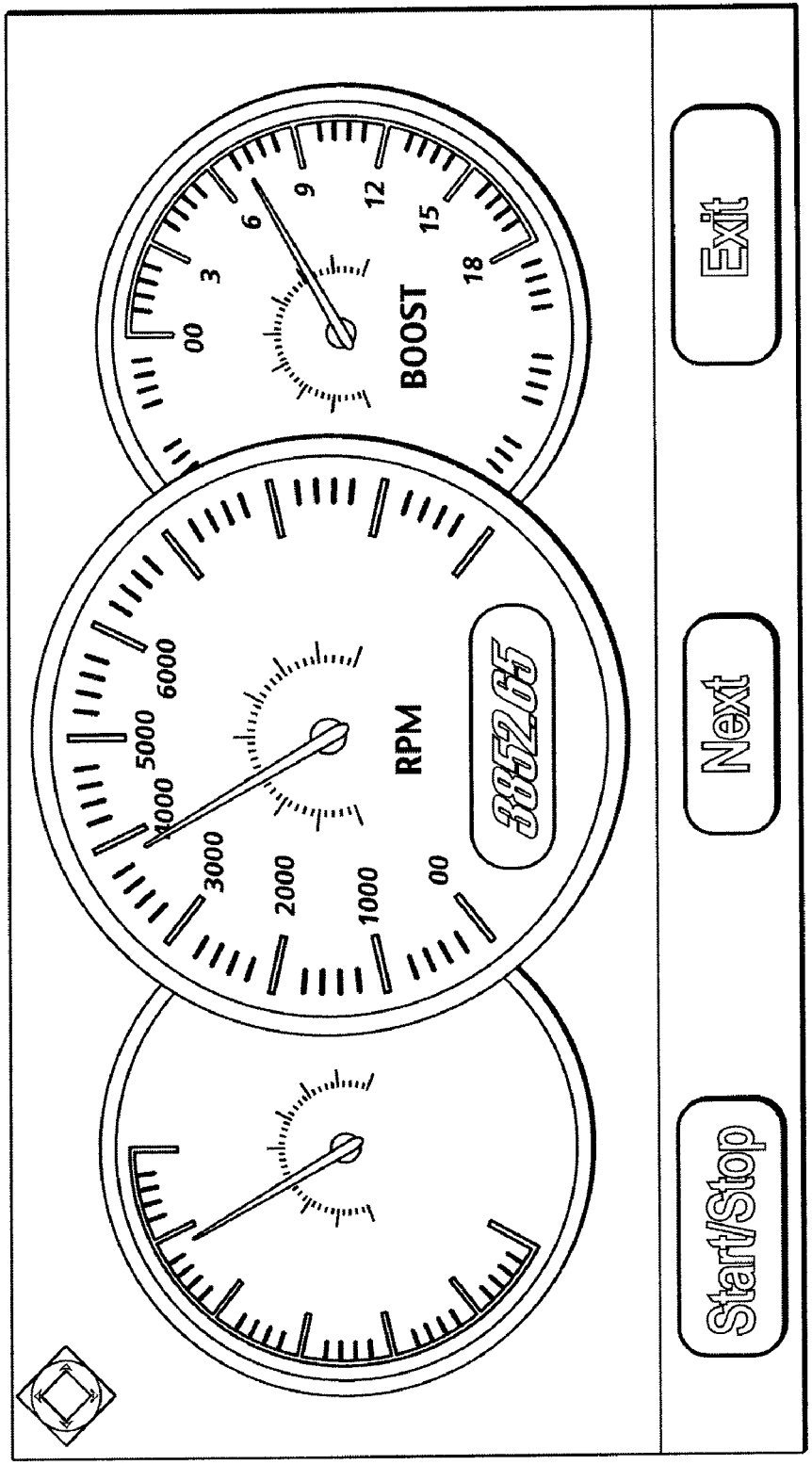
FIG. 5 is a front view illustrating a user configured gauge skin for displaying engine information.
Figure 6:
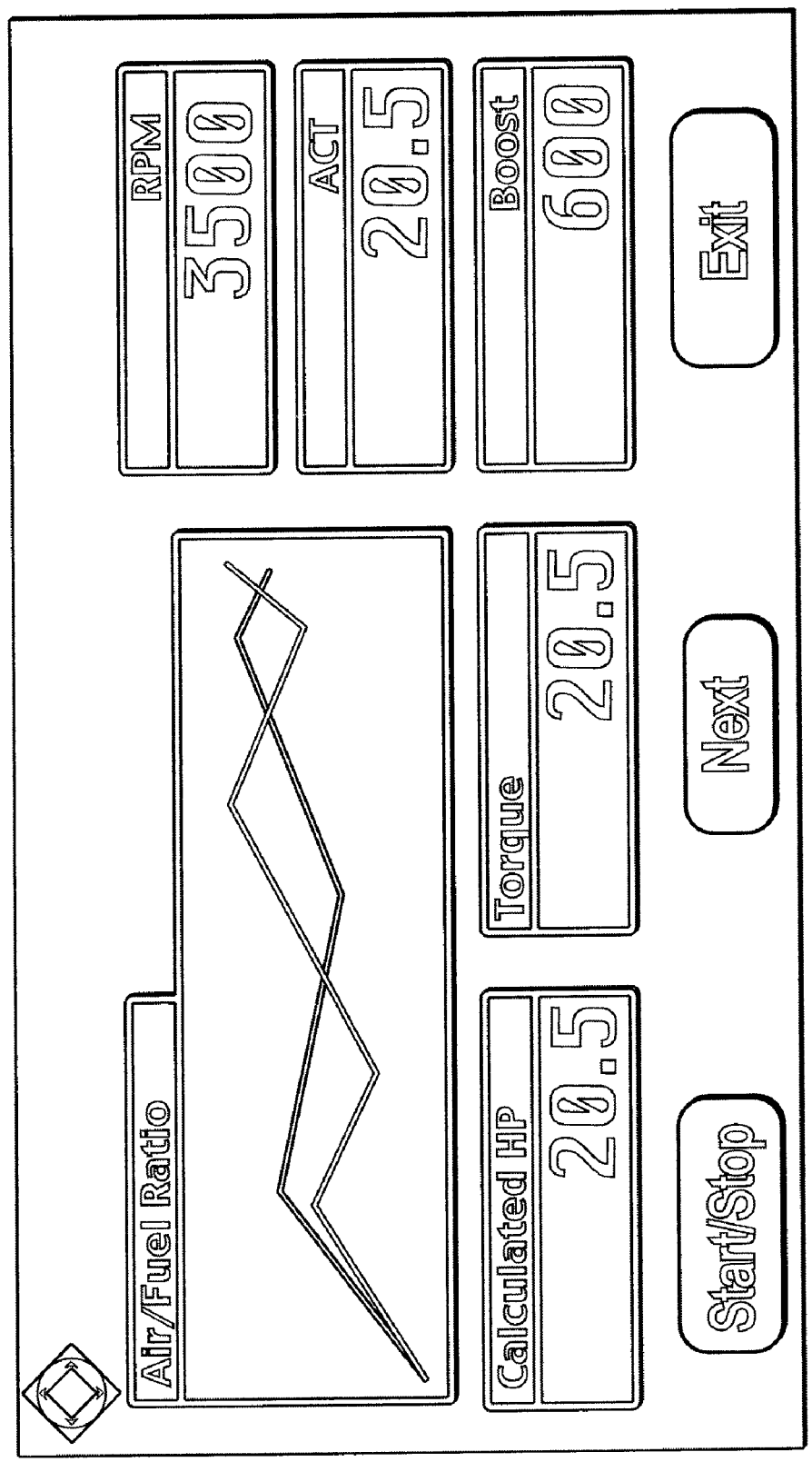
FIG. 6 is a front view illustrating a gauge skin including graphical as well as digital information.
Figure 7:
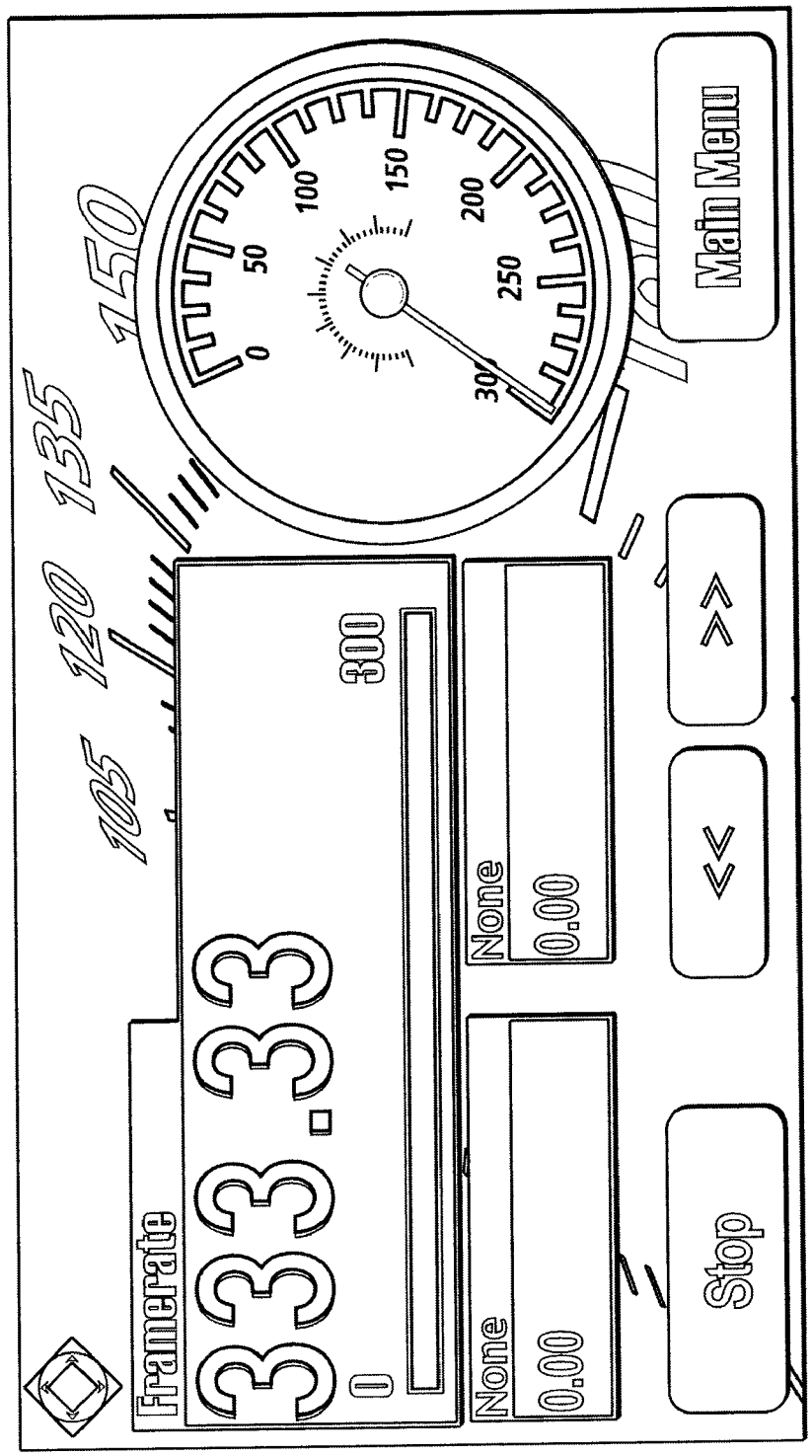
FIG. 7 is a front view illustrating a gauge skin including digital as well as an analog gauge representation.
Figure 8:
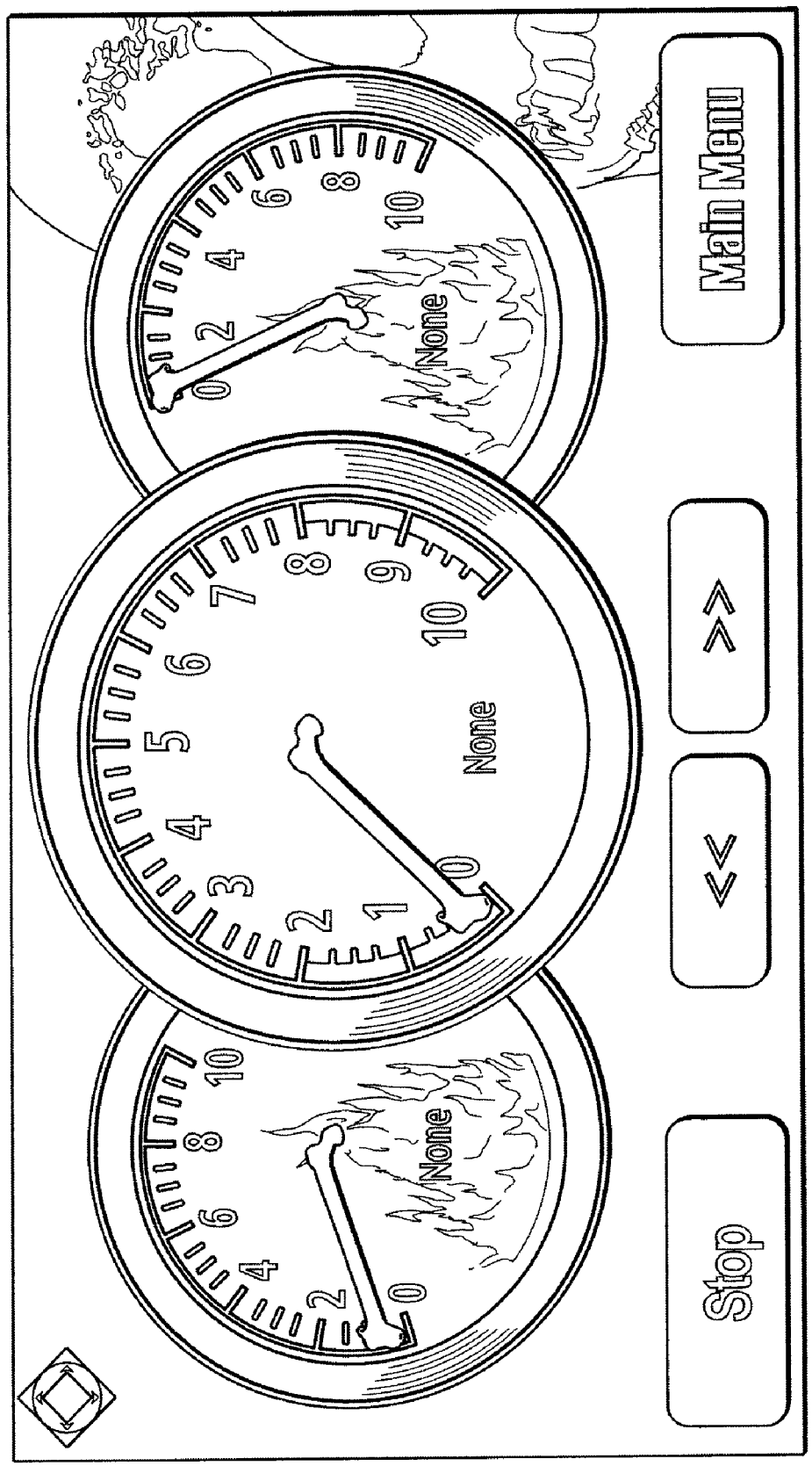
FIG. 8 is a front view illustrating a gauge skin configured with the instant invention.
Figure 9:
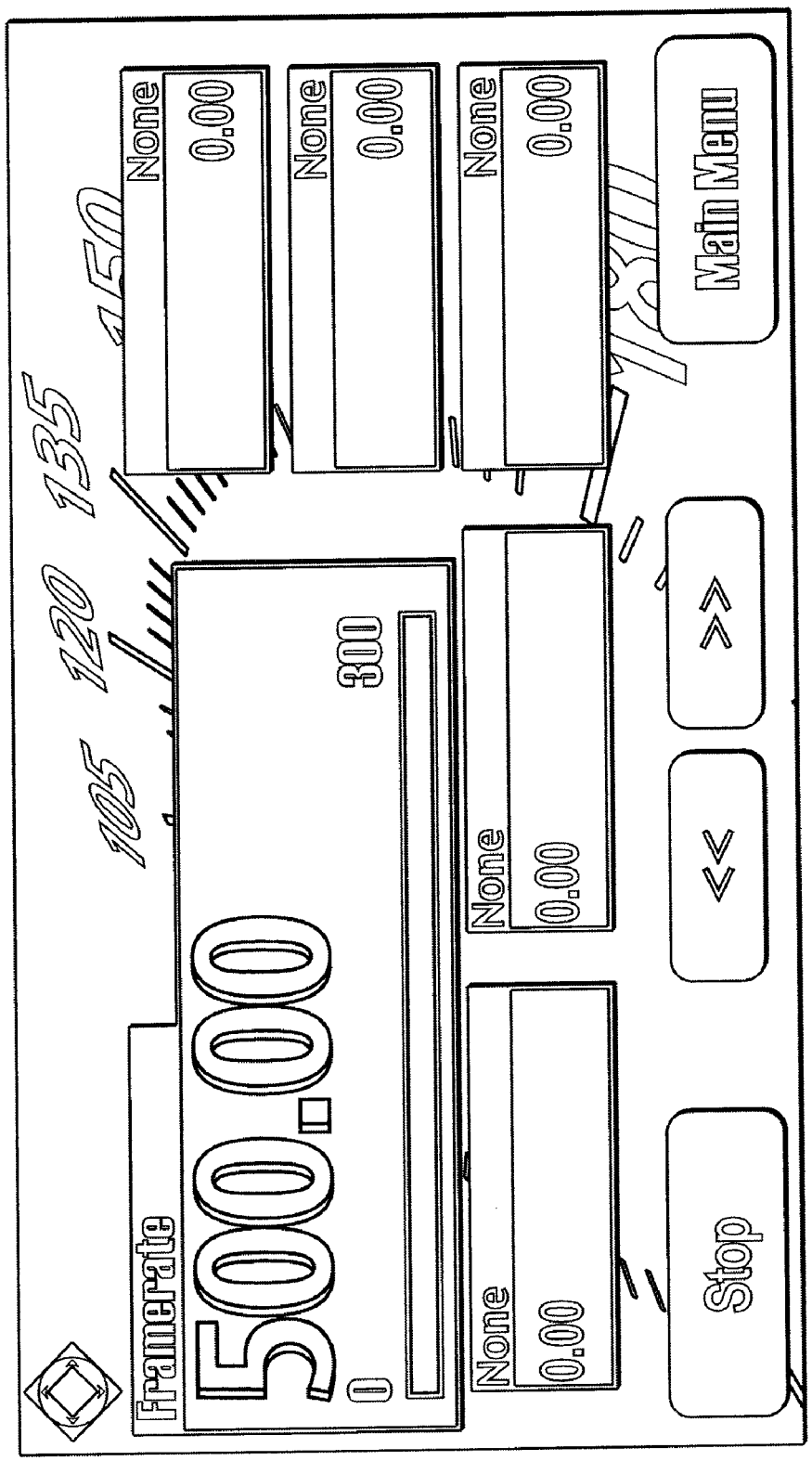
FIG. 9 is a front view illustrating a gauge skin configured with the instant invention.
Figure 10:
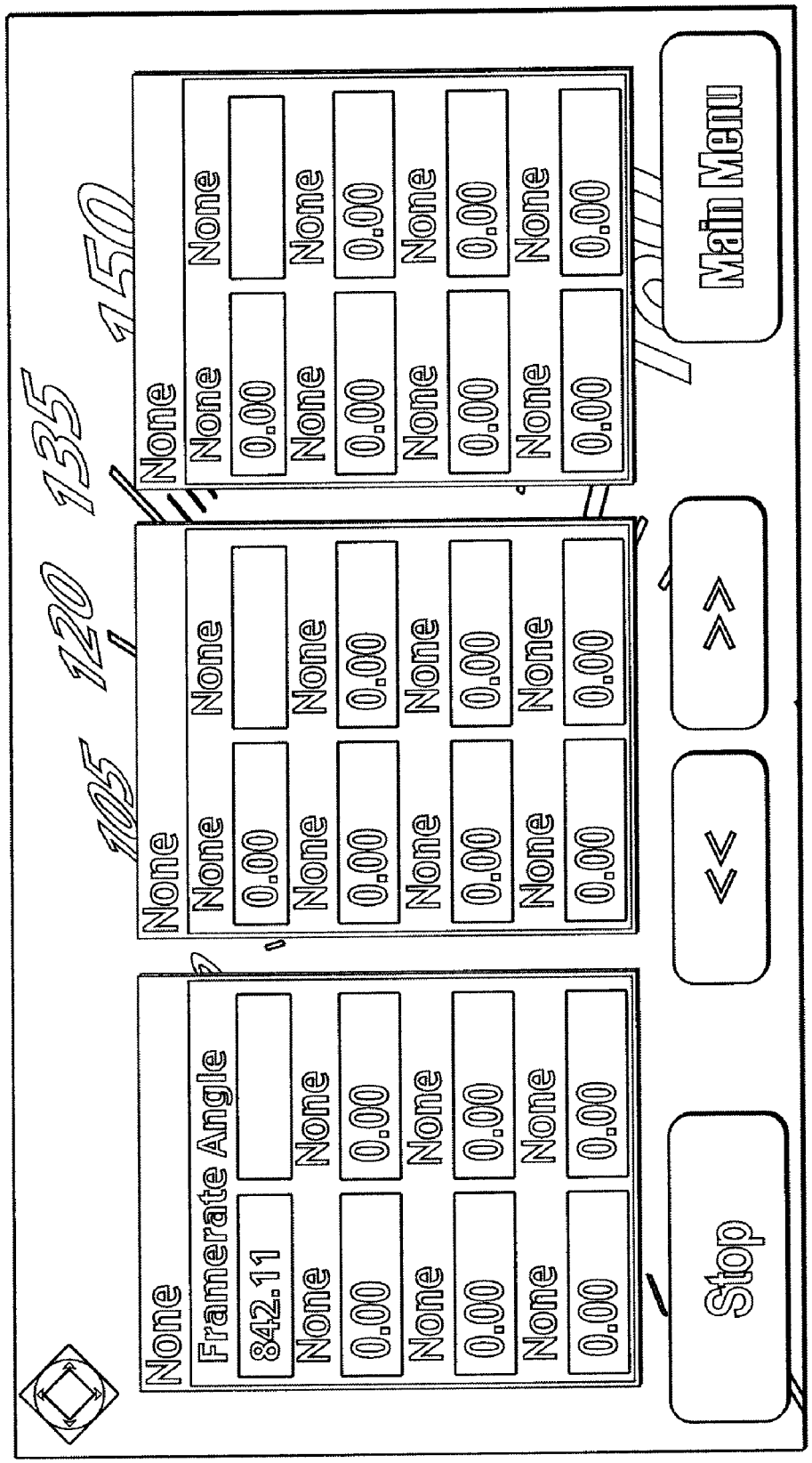
FIG. 10 is a front view illustrating a gauge skin configured with the instant invention.
Figure 11:
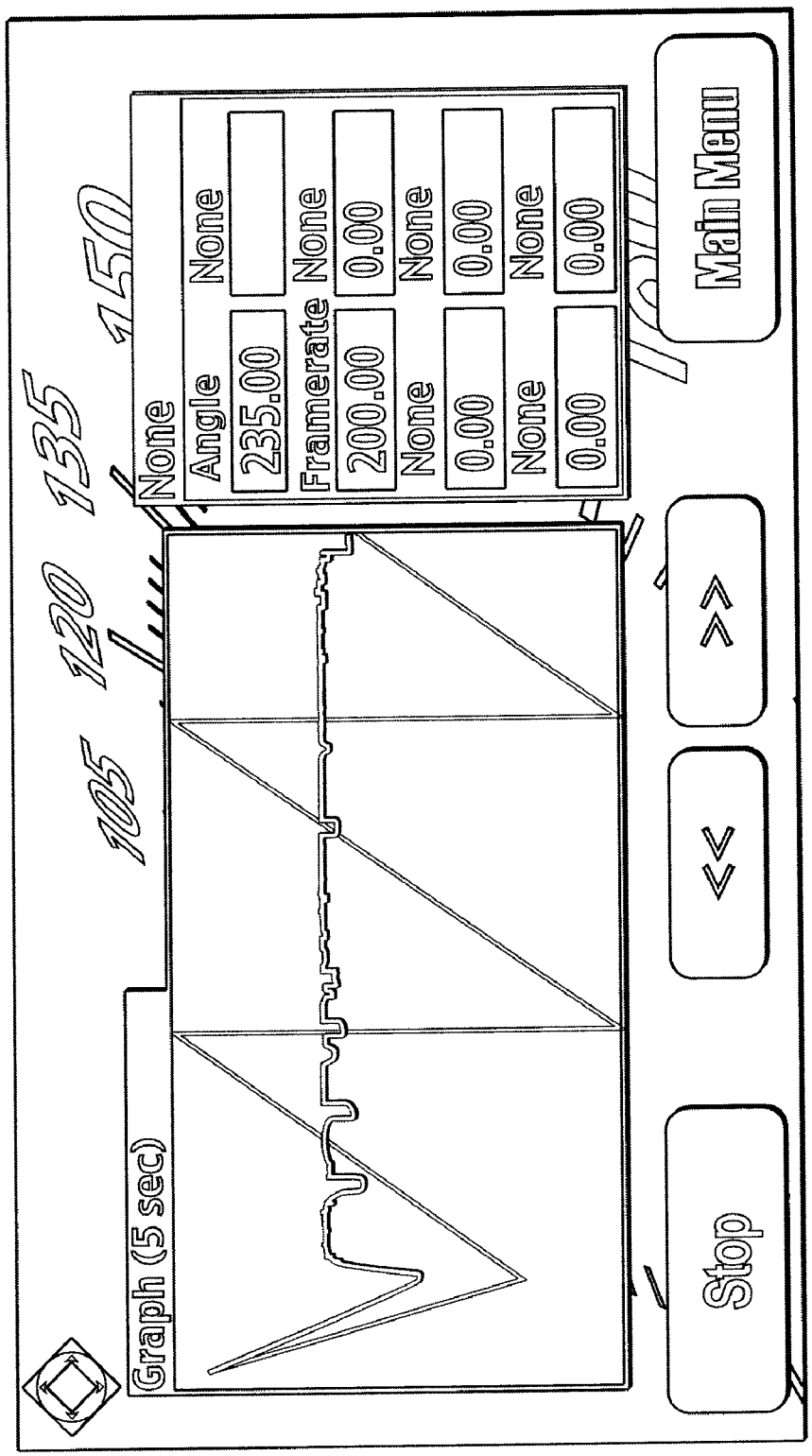
FIG. 11 is a front view illustrating a gauge skin configured with the instant invention.
Figure 12:
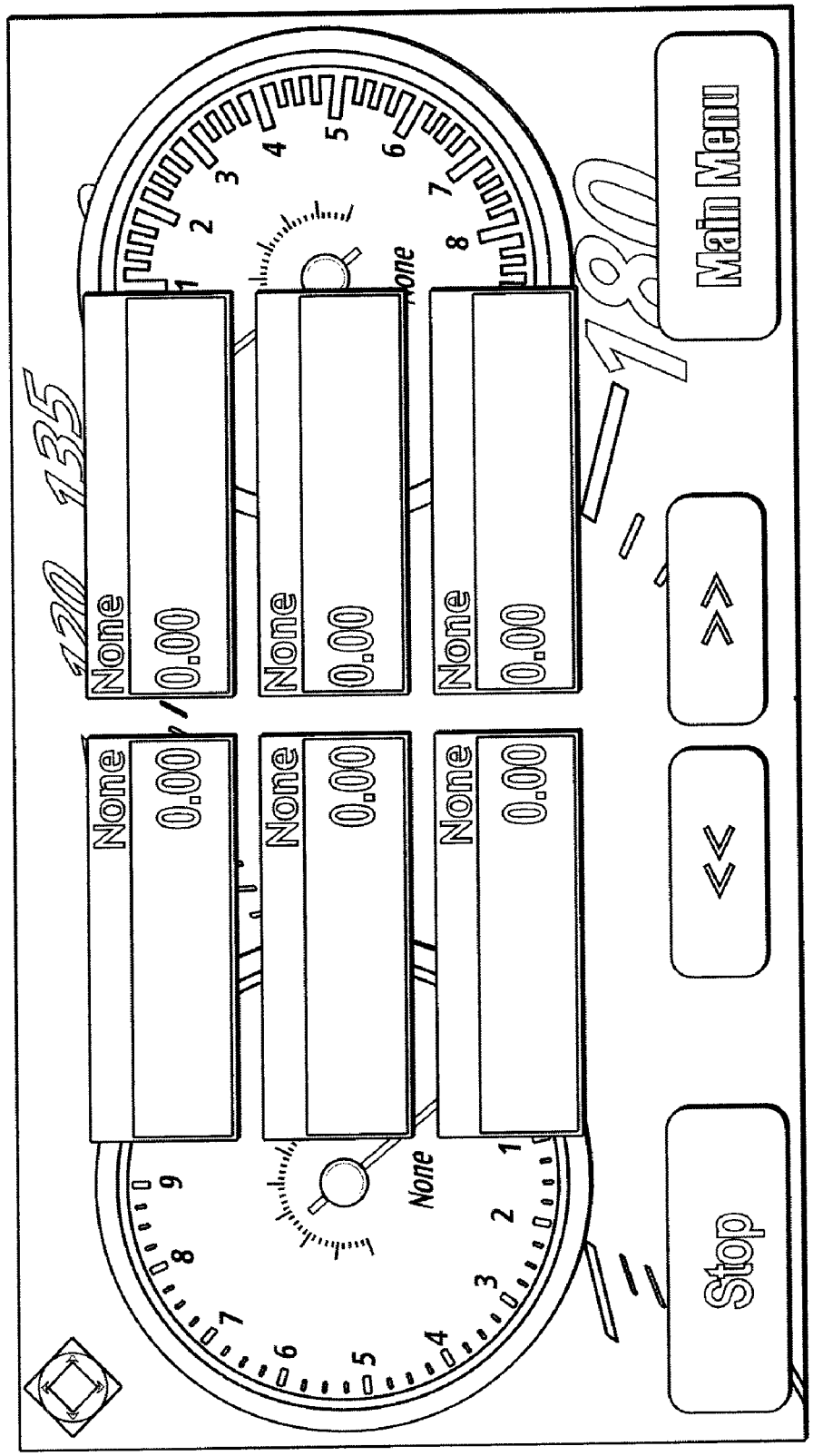
FIG. 12 is a front view illustrating a gauge skin configured with the instant invention.
Figure 13:
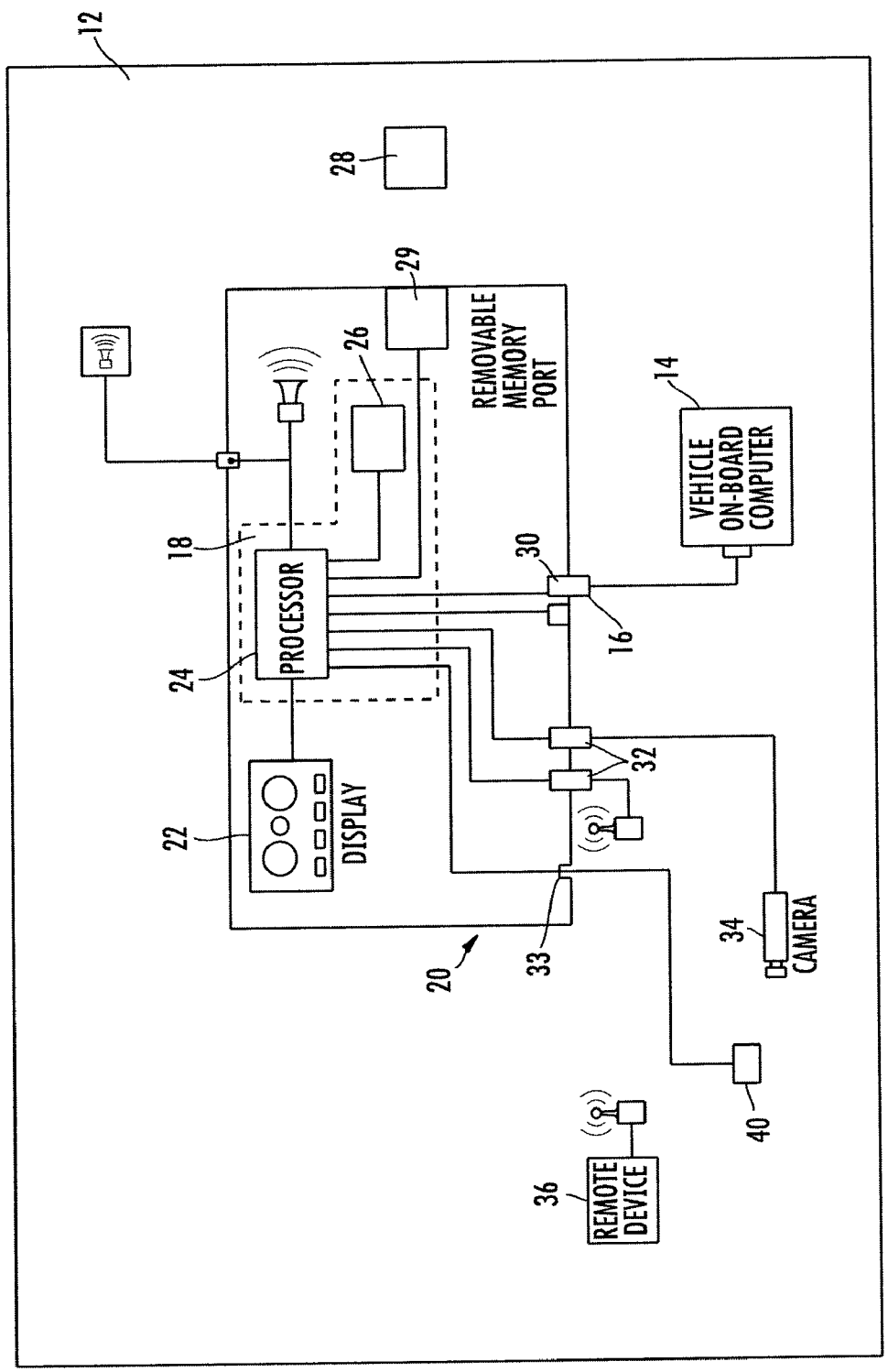
FIG. 13 is a schematic representation of one embodiment of the instant invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring generally to the figures, the present invention is directed toward a data acquisition and display device 10 for vehicles 12 that connects to the vehicle's on-board computer (s) 14 via a data link connector 16. The system includes a display module 20 suitable for permanent or temporary attachment within the interior of a vehicle. The display module preferably includes a full color display monitor 22 in electrical connection with the display computer 18 for bi-directional electrical communication therebetween. In a most preferred embodiment, the display monitor functions as a touch screen for inputting commands to the display computer 18 regarding the information to be displayed and the graphics associated with the display. The display computer 18 includes a suitable processor 24, operating system, software and tangible data storage media in the form of Random Access Memory (RAM) 26 to allow multiple user configurable displays and functions. In the preferred embodiment, the processor is an ARM9 manufactured by ATMEL. However, it should be noted that other processors suitable for communicating with the on-board computer(s) and operation of the display monitor 22 could be utilized without departing from the scope of the invention. The operating system is preferably LINUX, however other operating systems well known in the art are also contemplated to be within the scope of the invention. The operating system and DASHDAQ software are preferably stored on the RAM 26 storage media or alternatively on the removable memory 28, which is preferably a compact flash card or the like. In a most preferred embodiment, the removable memory provides up to 16 GB of data storage suitable for storing software as well as recording the data received from the on-board computer or the peripheral devices. Connection to the removable memory 28 is provided through the removable memory port 29 which is in electrical communication with the processor 24.

The display module 20 includes at least one vehicle connection port 30 in electrical connection with the display computer 18. A data link connector 16 extends between the vehicle connection port 30 and at least one on-board computer 14 positioned within the vehicle for bi-directional electrical communication of data relating to the various operating systems within the vehicle including, but not limited to, the powertrain control module (PCM), the engine control module (ECM), the transmission control module (TCM), the anti-lock brake system (ABS) control module, and the air bag control module.

The display module 20 collects information from the vehicle via multiple busses and sensors through the data link connector 16 which is connected to the On-Board Diagnostics Version II (OBD II) connection and displays the information on the screen of the display module in a user configured format. The direct connection between the display module and the on-board computer(s) facilitates bi-directional communication for receiving sensor data, diagnostics of vehicle systems as well as reprogramming of the on-board computer (s) for performance applications or troubleshooting.

The display module includes at least one peripheral input port 32 in electrical communication with the display computer for electrical communication with at least one peripheral device. Peripheral devices may include, but should not be limited to digital cameras, accelerometers, GPS and sensors. Digital cameras are understood to include both still and video cameras.

In the preferred embodiment, the computer readable memory carrier 26, 28 is constructed and arranged for storage of data received from one or more peripheral device(s). The display computer attaches a timestamp to the data received and stored by the computer readable carrier. In this manner the on-board computer data and the peripheral device data may be recalled and viewed simultaneously. The data from the different sources can be displayed on a single screen with matching timestamps. In this manner, data from sources such as a camera 34, vehicle speed from a GPS sensor, steering angle from the vehicle's computer bus, brake temperature from a wired sensor and wireless connection to an accelerometer can be recalled and viewed simultaneously on a user designed skin. The wireless connection to a remote device 36 may be accomplished through one of the USB 2.0 peripheral input ports 32 via a Bluetooth or 802.11b/g connection, while an analog sensor 40 may be directly connected to the analog input port 33.

Figure 14:
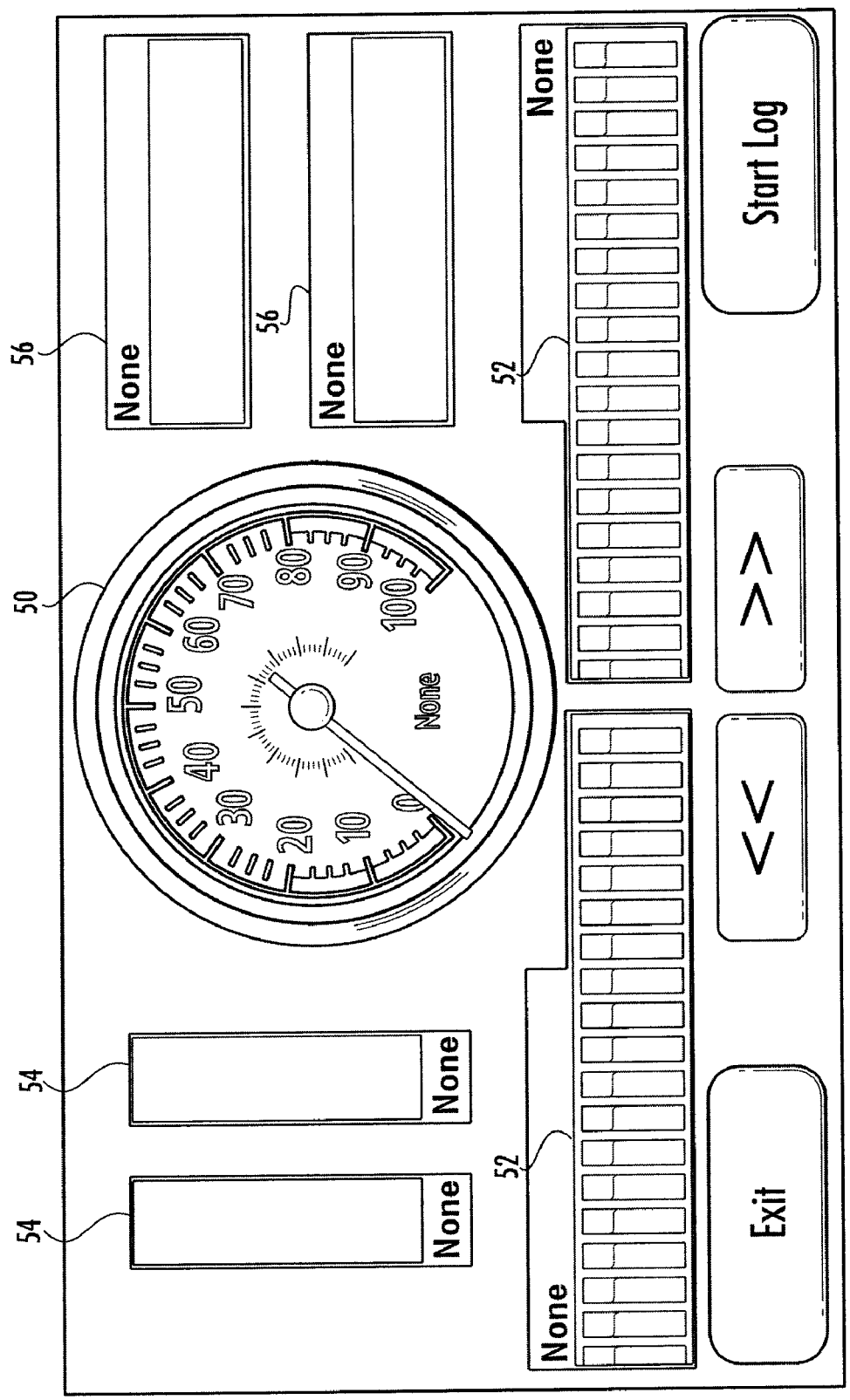
FIG. 14 is a front view illustrating a gauge skin configured with the instant invention.

Referring to FIGS. 4-12, and 14-24, the DASHDAQ software is configured to take input commands from the touch screen monitor 22 so that the user can design his/her own gauge displays "skins" which may include, but should not be limited to, graphics, graphs, fonts, needles, buttons, program generated objects, and backgrounds that can be stored and recalled for display on the monitor. FIG. 14 illustrates a gauge skin that includes an analog gauge 50, horizontal slider bar gauges 52, vertical slider bar gauges 54 and digital gauges 56. Any or all of these gauges can be configured by merely touching the gauge face illustrated on the display screen.

Figure 15:
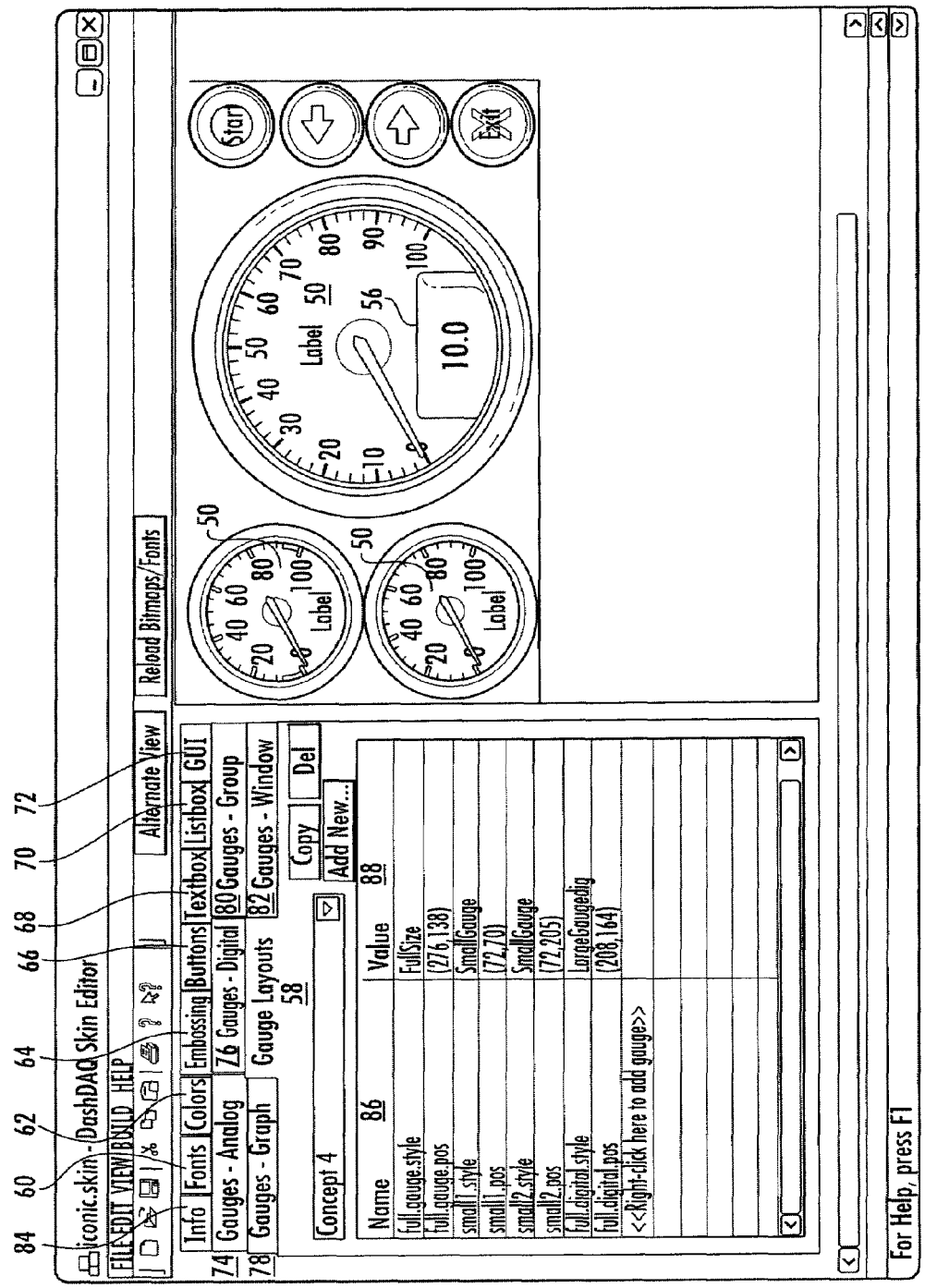
FIG. 15 is a front view illustrating the gauge skin editor in the configuration mode.
Figure 24:
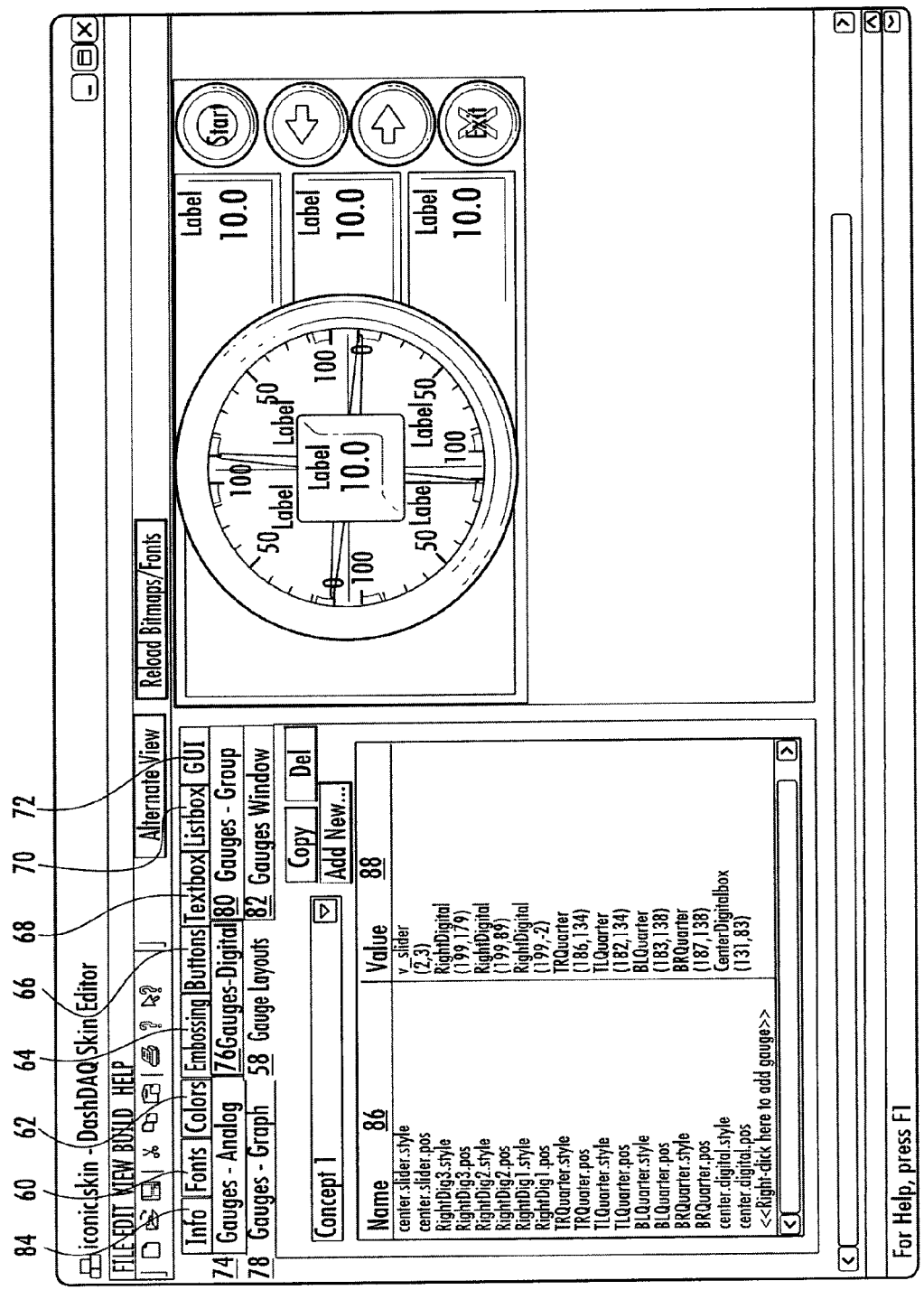
FIG. 24 is a front view illustrating configuration of an analog gauge skin.

Referring to FIGS. 15 and 24, typical configuration screens for gauge skin layouts are illustrated. In these screens the gauge layout tab 58 has been chosen to allow the user to configure the size, number and type of gauges that will be displayed on the skin. In FIG. 15 the user has chosen three analog gauges 50 and one digital gauge 56. The gauge is listed in the Name column 86 while the value and position of the gauge is listed in the value column 88. New and/or different gauges may be added or subtracted from the skin by selecting the desired line in the name column 86. Positioning and size of the gauge displayed may be altered by selecting the desired line of the value column 88. In FIG. 24 the user has chosen an analog gauge and has broken it into four independent analog gauges each having about a 90 degree sweep for the needle. A digital gauge is positioned in the center of the analog gauge. It should be noted that each of these gauges could be assigned to a different signal. Alternatively, the same signal could be assigned to two gauges each having a different scale, limits or alarm to allow the user to closely monitor some parameter as desired. Other gauge properties available for selection and change within the configuration mode include, but are not limited to, fonts 60, colors 62, embossing 64, buttons 66, textbox 68, listbox 70, graphical user interface 72, analog gauges 74, digital gauges 76, graph gauges 78, group gauges 80, gauges window 82 and info 84.

Figure 16:
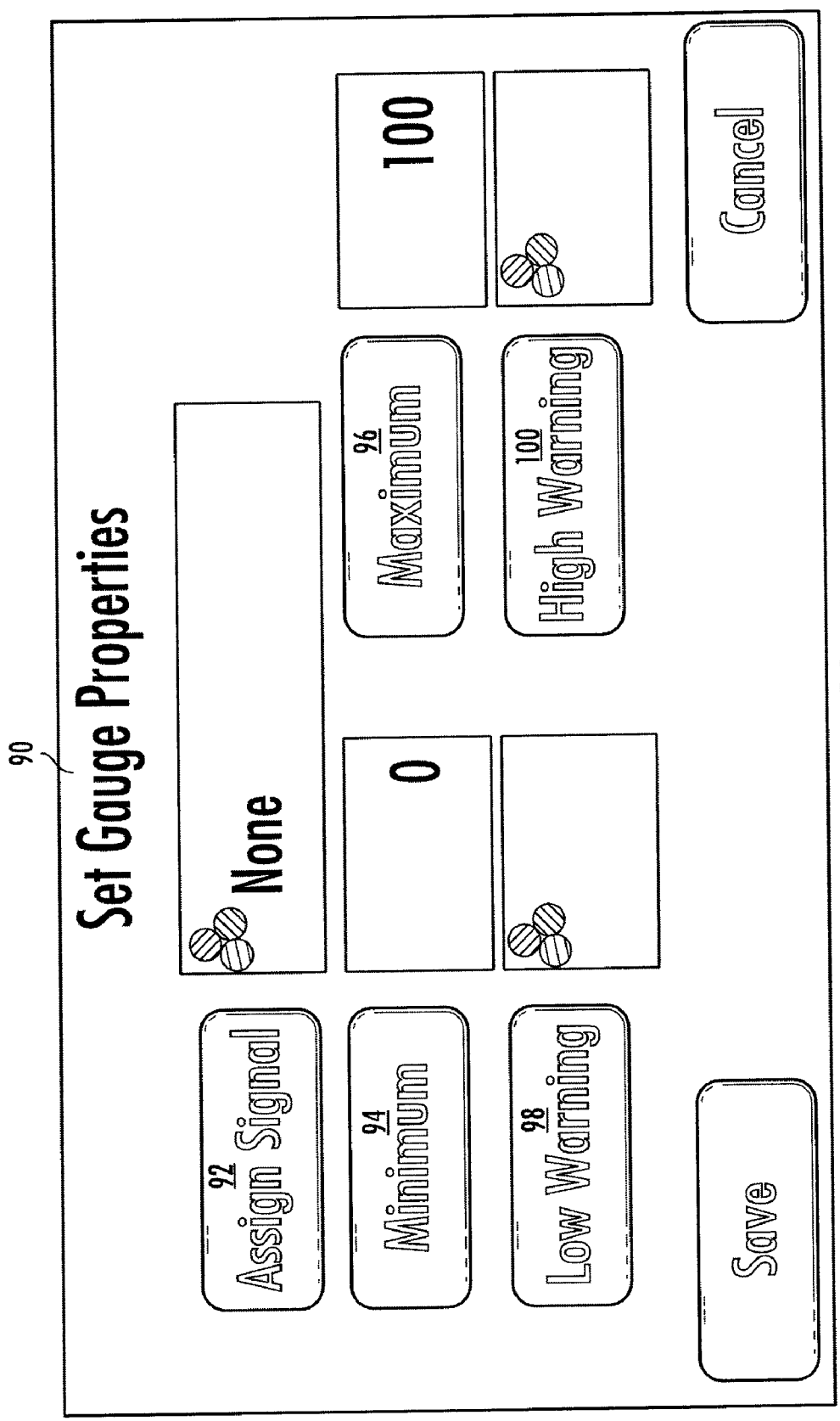
FIG. 16 is a front view of a Set Gauge Properties screen as seen within the configuration mode.

Referring to FIG. 16, the Set Gauge Properties screen 90 is illustrated. In this screen the user can assign a particular signal received into the display module 20 to a particular gauge within a skin by selecting the assign signal button 92. The user can also establish the minimum and maximum limits displayed for the gauge using the minimum and maximum buttons 94, 96 and can establish a warning associated with either limit to a level of the user's choosing using the low warning and high warning buttons 98 and 100. In addition, the user can choose a color and/or audible alarm that is associated with the warning level chosen by the user.

Figure 17:
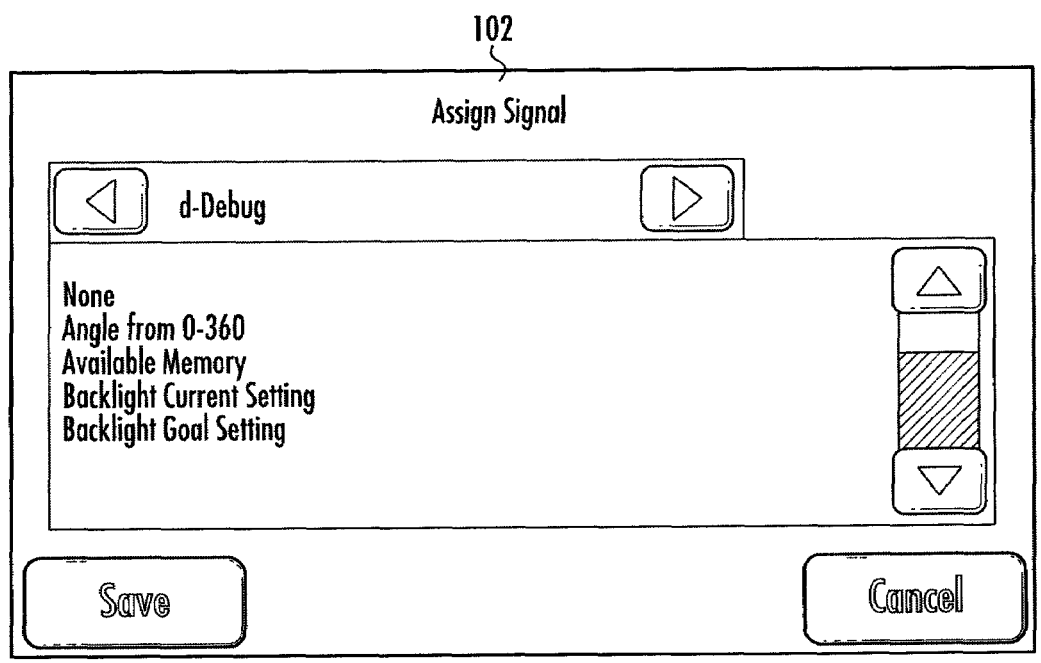
FIG. 17 is a front view of an Assign Signal screen as seen within the configuration mode.

Referring to FIG. 17, the Assign Signal screen 102 is illustrated. The assign signal screen is called up when the user selects the assign signal button 92 (FIG. 16). Within this screen the user can assign the signal received by the display module 20. The user can also determine the angle of sweep for the needle of an analog gauge 50, assign memory for the recoding of data, adjust backlight settings for the gauge and the like.

Figure 18:
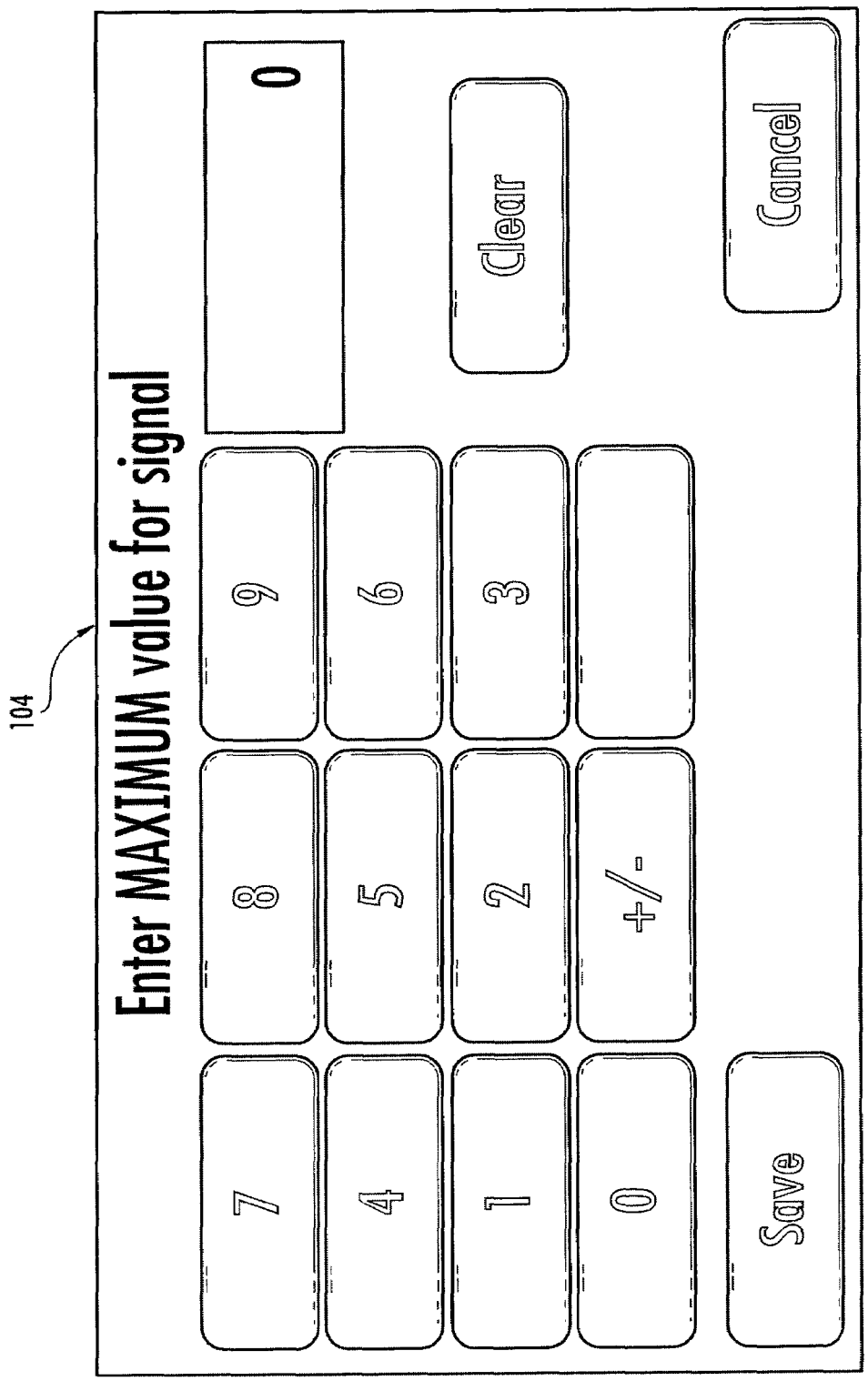
FIG. 18 is a front view of an Enter Maximum Value screen as seen within the configuration mode.

Referring to FIG. 18, the Enter Maximum Value screen 104 is illustrated. This screen is called up when the user selects the High Warning Key 100 (FIG. 16). In this screen the user can establish the maximum value for any type of gauge being illustrated. The screen is the same or similar for the establishment of the minimum gauge value, low warning and high warning.

Figure 19:
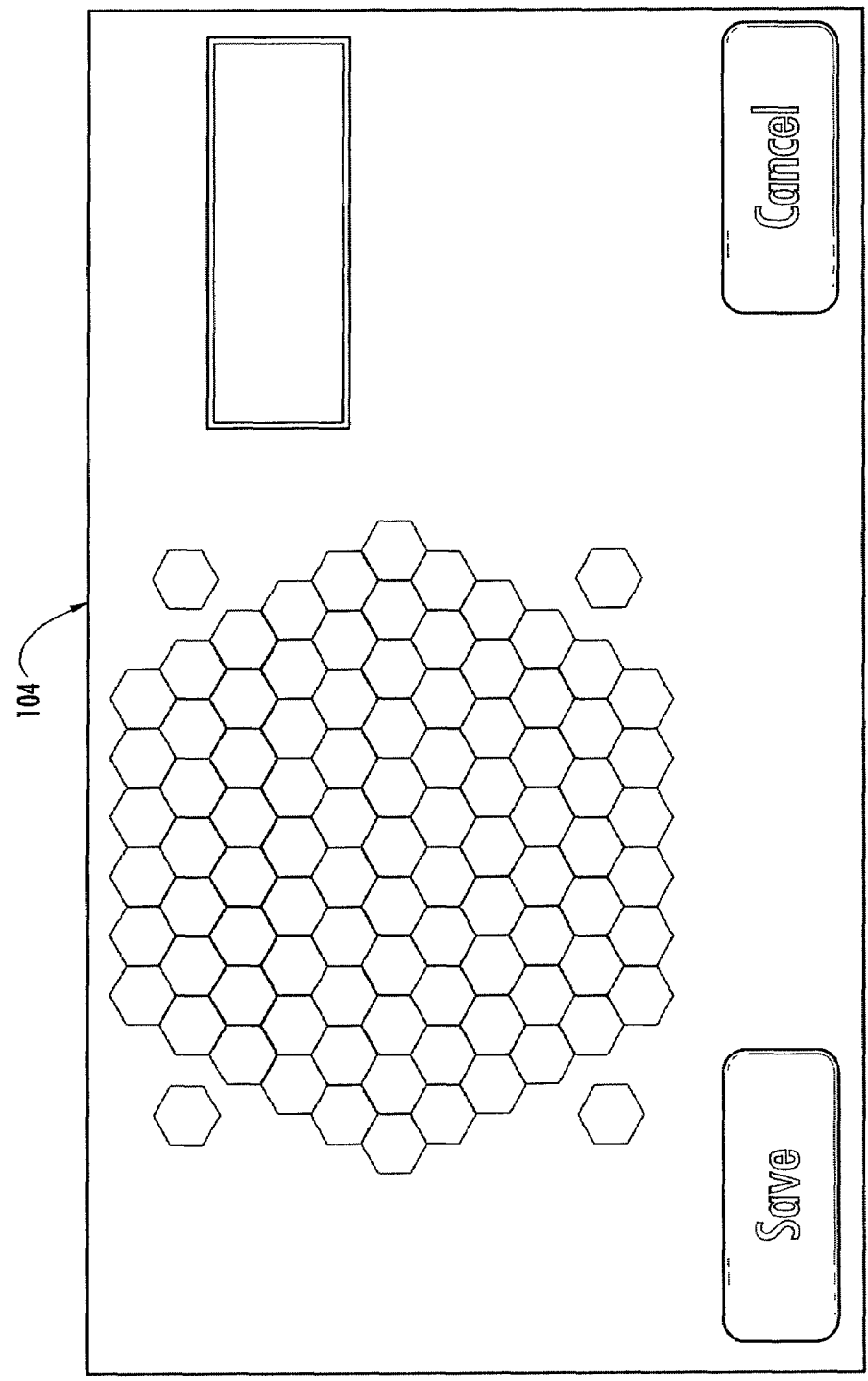
FIG. 19 is a front view of a Color Value screen as seen within the configuration mode.

Referring to FIG. 19, the Set Colors Screen 104 is illustrated. The Set Colors screen is called up upon selecting the Colors button 62 (FIG. 15). The Set Colors screen allows the user to select a color for every part of the gauge chosen for display including, but not limited to, font color, needle color, background color, slider bar color, graph color, button color, etc.

Figure 20:
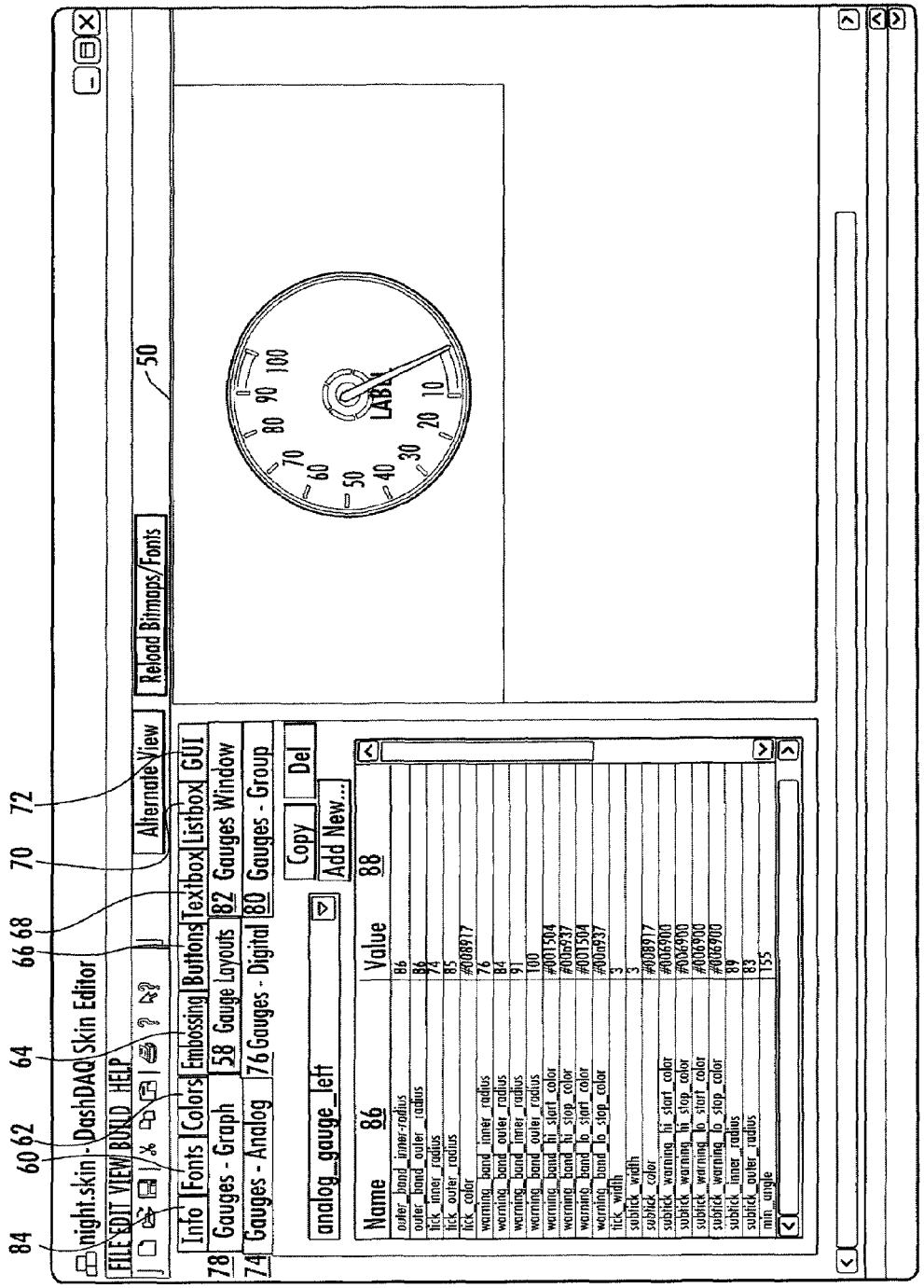
FIG. 20 is a front view illustrating configuration of an analog gauge skin.
Figure 27:
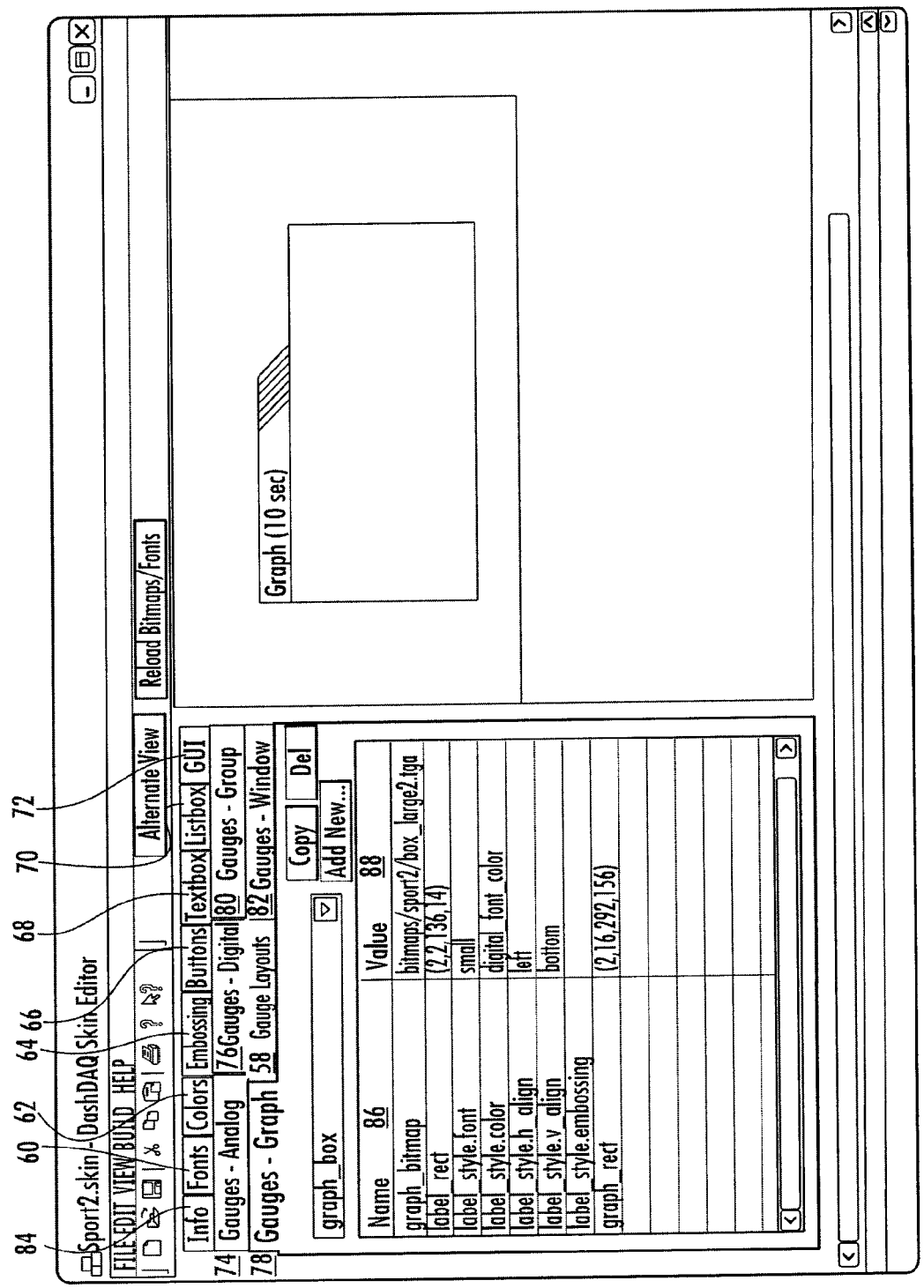

Referring to FIG. 20, the configuration screen is illustrated in association with a single analog gauge. In this screen the user has designed a gauge with inner and outer bands around the perimeter of the gauge for which he has also selected the colors. The user has also configured low warnings and high warnings for which colors and color changes have been configured. In addition, the user has configured angle sweep and tick resolution for the needle and background color for the gauge.

Referring to FIG. 21, the configuration screen for a graph type gauge skin has been entered by clicking button 78. In this screen the user can assign a signal, set the size of the gauge, choose colors, allocate memory, and choose fonts etc. by clicking the tabs within the configuration screen for configuring the gauge skin as desired.

Figure 22:
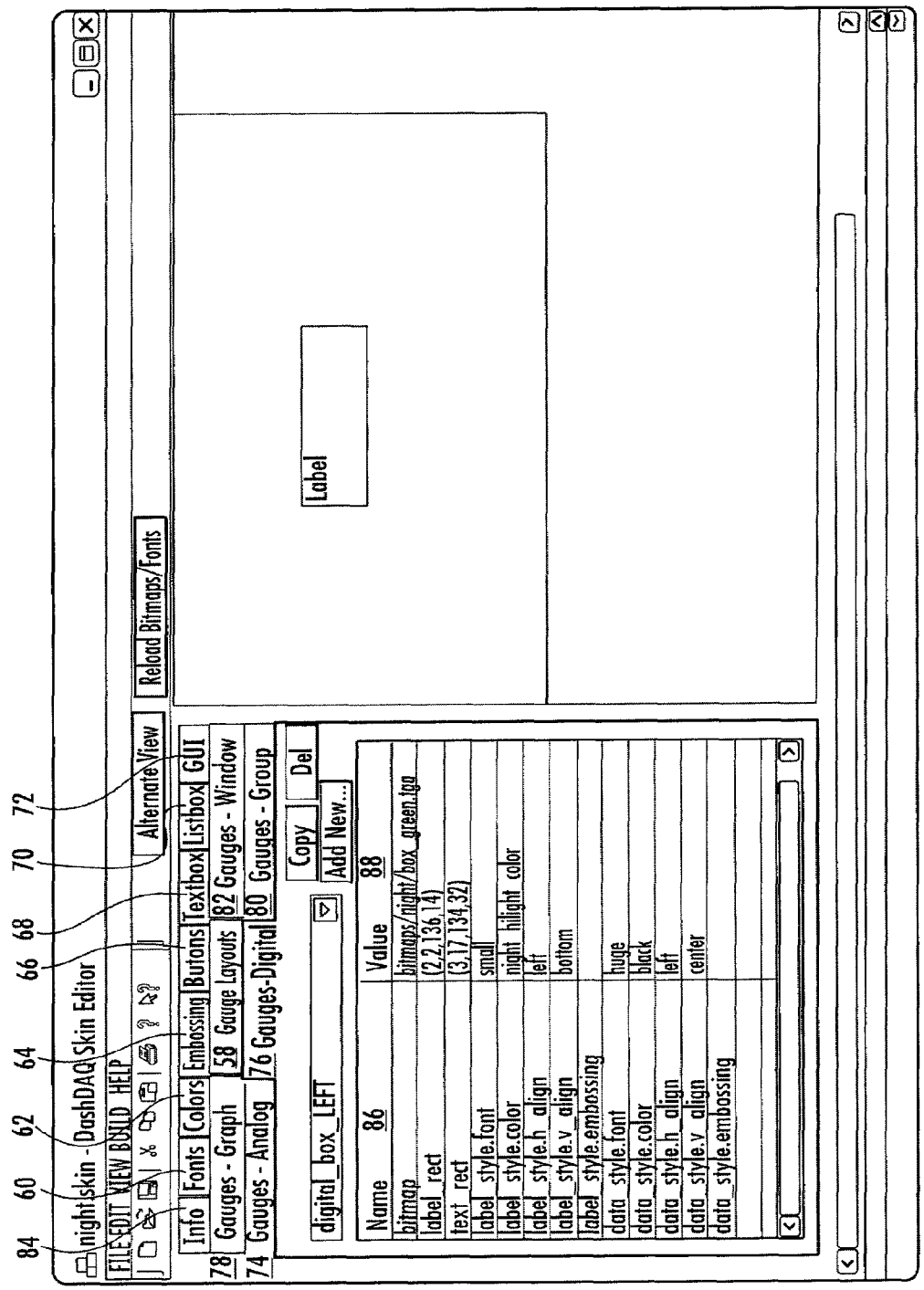
FIG. 22 is a front view illustrating configuration of a digital gauge skin.
Figure 23:
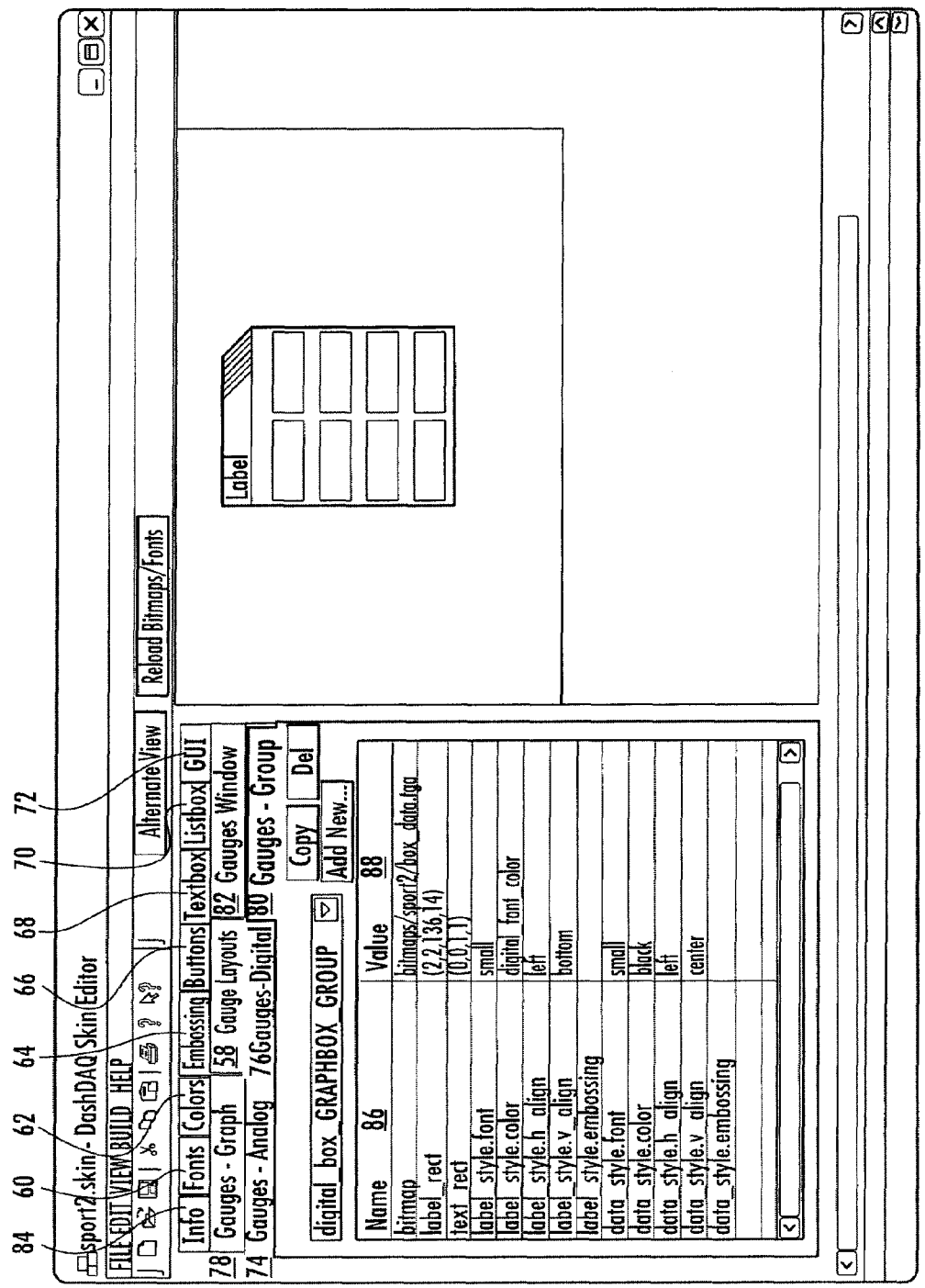
FIG. 23 is a front view illustrating configuration of a digital gauge skin.

Referring to FIGS. 22 and 23, the configuration screen for digital gauge skins is illustrated. This screen is entered by clicking on tab 76 allowing the user to configure a single digital gauge (FIG. 22) or a multiple digital gauge (FIG. 23). As in the other configuration screens the user can select any tab for configuration of the various gauge skin parameters.

Referring to FIGS. 4-12, as a safety feature, the system includes a daylight sensor 38 (FIG. 1) which can be configured for automatic skin changes in response to ambient light conditions. The system also includes a feature wherein the display may change background color, flash, change the display within a gauge skin, font size and shape, and/or sound alarms based on the signal values being received from the busses. These signals values represent vehicle parameters which are outside of desired and normal operational limits; for example, if the engine RPM exceeds the manufacturers limit, if the temperature of the cooling water is too high, if the oil pressure in the engine is too low, etc.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of displaying data representative of data received from, an on-board computer of a motor vehicle comprising the steps of:

providing a data acquisition and display system; connecting said data acquisition display system to a motor vehicle via a data link connector extending between a vehicle connection port and at least one on-board computer positioned within said motor vehicle for bi-directional electrical communication of data relating to said motor vehicle, said data acquisition and display system including software constructed and arranged for operator configuration of said data acquisition and display system regarding the delivery of instructions to a display monitor for display of an operator configured visual image relating to said data relating to said motor vehicle received from said on-board computer;

providing said display monitor with a touch sensitive screen display for display of said operator configured visual image in the form of a gauge skin, said data acquisition and display system having a configuration mode for selecting gauge skin properties according to various modifying options;

touching a gauge skin displayed upon said screen display to toggle said data acquisition and display system into said configuration mode;

configuring said gauge skin by selecting the desired properties for said gauge skin;

saving said configuration to a memory means in electrical connection with said data acquisition and display system;

recalling said configured gauge skin for display on said display monitor, said configured gauge skin representative of said motor vehicle data, said display monitor simultaneously displaying at least two said operator configured visual images relating to data received, the position of each of said at least two operator configured visual images on said display monitor being repositionable relative to other operator configured images on said display monitor.

2. The method of displaying data representative of data received from an on-board computer of a motor vehicle of claim 1 wherein said data acquisition and display system includes at least one peripheral input port in electrical communication with at least one peripheral device.

3. The method of displaying data representative of data received from an on-board computer of a motor vehicle of claim 2 wherein said steps include selecting the source of the data from the group consisting of on-board computers and peripheral devices for display on said gauge skin.

4. The method of displaying data representative of data received from an on-board computer of a motor vehicle of claim 1 wherein one of said gauge skin properties includes selection of an on-board computer monitored parameter.

5. The method of displaying data representative of data received from an on-board computer of a motor vehicle of claim 1 wherein one of said gauge skin properties includes selection of the type of gauge displayed.

6. The method of displaying data representative of data received from an on-board computer of a motor vehicle of claim 5 wherein the type of gauge displayed is selected from the group consisting of analog gauge, digital gauge, slider bar, graph and dashboard.

7. The method of displaying data representative of data received from an on-board computer of a motor vehicle of claim 6 wherein one of said gauge skin properties includes establishing the high and low limits of the gauge displayed.

8. The method of displaying data representative of data received from an on-board computer of a motor vehicle of claim 7 wherein one of said gauge skin properties includes establishing the number of divisions displayed between said high and said low limits of the gauge displayed.

9. The method of displaying data representative of data received from an on-board computer of a motor vehicle of claim 7 wherein one of said gauge skin properties includes establishing warnings associated with said high and said low limits of the gauge displayed.

10. The method of displaying data representative of data received from an on-board computer of a motor vehicle of claim 7 wherein said warnings associated with said high and said low limits are selected from the group consisting of color changes and audible signals.

11. The method of displaying data representative of data received from an on-board computer of a motor vehicle of claim 6 wherein one of said gauge skin properties includes establishing the unit of measure of the gauge displayed.

12. The method of displaying data representative of data received from an on-board computer of a motor vehicle of claim 6 wherein one of said gauge skin properties includes establishing the colors and graphic designs utilized for the gauge displayed.

13. The method of displaying data representative of data received from an on-board computer of a motor vehicle of claim 6 wherein one of said gauge skin properties includes establishing the unit of measure of the gauge displayed.

14. A data acquisition and display system for displaying operator configurable information within a motor vehicle comprising:
a display module constructed and arranged to be secured within the interior of said motor vehicle,
the display module comprising a display computer and a display monitor in electrical communication with each other, said display module comprising at least one vehicle connection port in electrical connection with said display computer, a data link connector extending between said vehicle connection port and at least one on-board computer positioned within said motor vehicle for bi-directional electrical communication of data relating to said motor vehicle,
said display computer configured to simultaneously display at least two operator configured visual images relating to data received, the position of each of said at least two operator configured visual images on said display monitor being repositionable relative to other operator configured images on said display monitor,
wherein the display monitor has a touch sensitive screen display for display of said operator configured visual image in the form of a gauge skin, said data acquisition and display system having a configuration mode for selecting gauge skin properties according to various modifying options,
wherein the display computer is configured to configure said gauge skin by selecting the desired properties for said gauge skin,
wherein the display computer is configured to save said configuration to a memory means in electrical connection with said data acquisition and display system,
wherein the display computer is configured to recall said configured gauge skin for display on said display monitor, said configured gauge skin representative of said motor vehicle data, said display monitor simultaneously displaying at least two said operator configured visual images relating to data received, the position of each of said at least two operator configured visual images on said display monitor being repositionable relative to other operator configured images on said display monitor.

15. The data acquisition and display system of claim 14 wherein said display computer is switched to a configuration mode by clicking upon graphics displayed upon said display monitor, said graphics then being configurable.

16. The data acquisition and display system of claim 15 wherein said configurable graphics are selected from the group consisting of gauge type, graphs, fonts, needles, buttons, program generated objects and backgrounds.

17. The data acquisition and display system of claim 14 wherein said display computer is constructed and arranged to automatically change said graphics based on ambient light conditions within the motor vehicle.

18. The data acquisition and display system of claim 14 wherein said display computer is constructed and arranged to automatically change said graphics based on signals received from said on-board computer.

19. The data acquisition and display system of claim 15 wherein display computer is constructed and arranged to automatically change said configurable graphics or emit an audio sound based on signals received from said on-board computer, said signals representing vehicle operating parameters outside of operator configured limits.

* * * * *